United States Patent
Morimoto et al.

(10) Patent No.: US 8,844,092 B2
(45) Date of Patent: Sep. 30, 2014

(54) CLEANING DEVICE FOR CEILING TRANSPORT FACILITY AND OPERATION METHOD THEREOF

(75) Inventors: Yuichi Morimoto, Omihachiman (JP); Tadahiro Yoshimoto, Shiga (JP); Yuji Baba, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 132 days.

(21) Appl. No.: 13/491,349

(22) Filed: Jun. 7, 2012

(65) Prior Publication Data

US 2012/0312327 A1    Dec. 13, 2012

(30) Foreign Application Priority Data

Jun. 10, 2011  (JP) .................. 2011-130566

(51) Int. Cl.
*A47L 7/00*      (2006.01)
*B08B 5/04*      (2006.01)
*B65G 45/00*     (2006.01)

(52) U.S. Cl.
CPC .. *B08B 5/04* (2013.01); *B65G 45/00* (2013.01)
USPC .......................................... 15/339; 15/340.3

(58) Field of Classification Search
USPC .................... 15/301, 339, 340.1, 340.3, 3.19
See application file for complete search history.

(56) References Cited

U.S. PATENT DOCUMENTS

| | | | |
|---|---|---|---|
| 3,641,618 A * | 2/1972 | Rainey et al. | 15/312.1 |
| 3,786,779 A * | 1/1974 | Brunel et al. | 118/668 |
| 3,806,979 A * | 4/1974 | Bonami | 15/21.1 |
| 4,033,285 A * | 7/1977 | Dugle et al. | 118/681 |
| 2004/0025739 A1 | 2/2004 | Matsukawa | |

FOREIGN PATENT DOCUMENTS

| | | |
|---|---|---|
| JP | 04053151 A | 2/1992 |
| JP | 07124080 A | 5/1995 |
| JP | 11208885 A | 8/1999 |
| JP | 2000118709 A | 4/2000 |
| JP | 2000271552 A | 10/2000 |
| JP | 200287250 A | 3/2002 |
| JP | 200581947 A | 3/2005 |
| JP | 2005148889 A | 6/2005 |
| JP | 2005334836 A | 12/2005 |
| JP | 200649440 A | 2/2006 |
| JP | 200946221 A | 3/2009 |
| JP | 201145694 A | 3/2011 |

* cited by examiner

Primary Examiner — Dung Van Nguyen
(74) Attorney, Agent, or Firm — The Webb Law Firm

(57) ABSTRACT

An object of the invention is to provide a cleaning device for a ceiling transport facility in which a plurality of locations to be cleaned can be cleaned appropriately while avoiding having insufficient suction power for the plurality of cleaning suction portions.

A travelling guide portion for a transport carriage is provided on the ceiling side. The cleaning carriage that can travel along the travelling guide portion is provided with a plurality of cleaning suction portions for performing suctioning action on a plurality of locations to be cleaned in the travelling guide portion and a vacuum cleaner which is in communication with the plurality of cleaning suction portions. The plurality of cleaning suction portions are divided to a plurality of functioning units. And an interrupting device is provided for selectively permitting and preventing the communication of each of the plurality of the functioning units with the vacuum cleaner.

13 Claims, 21 Drawing Sheets

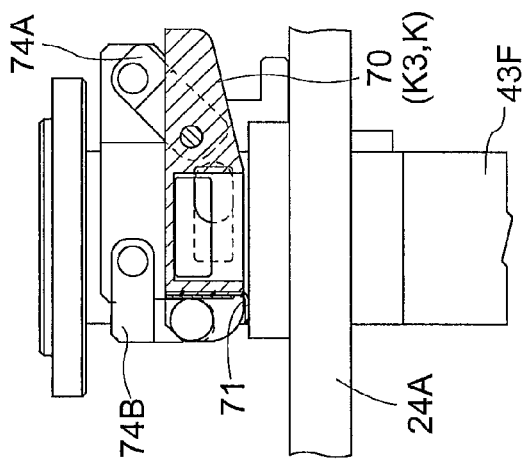
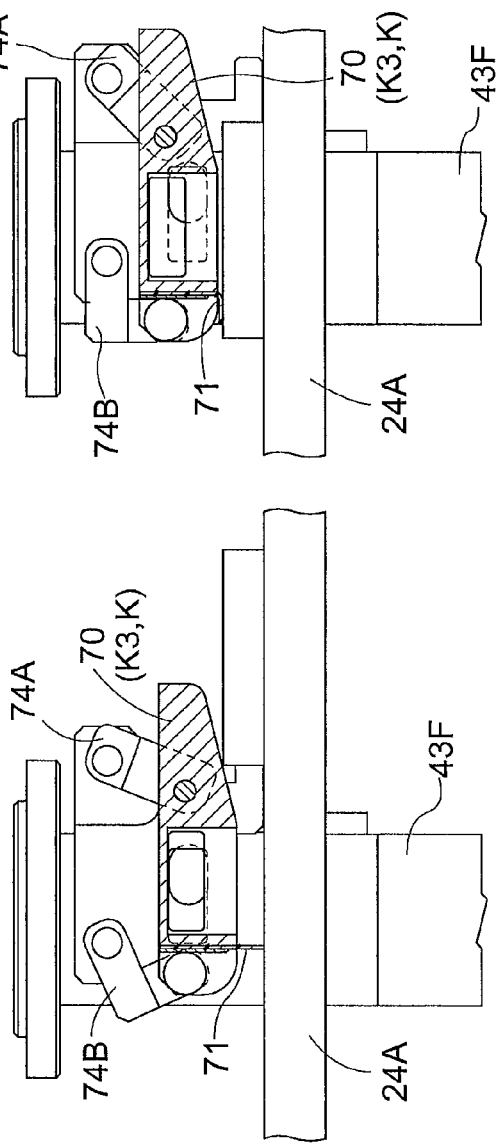
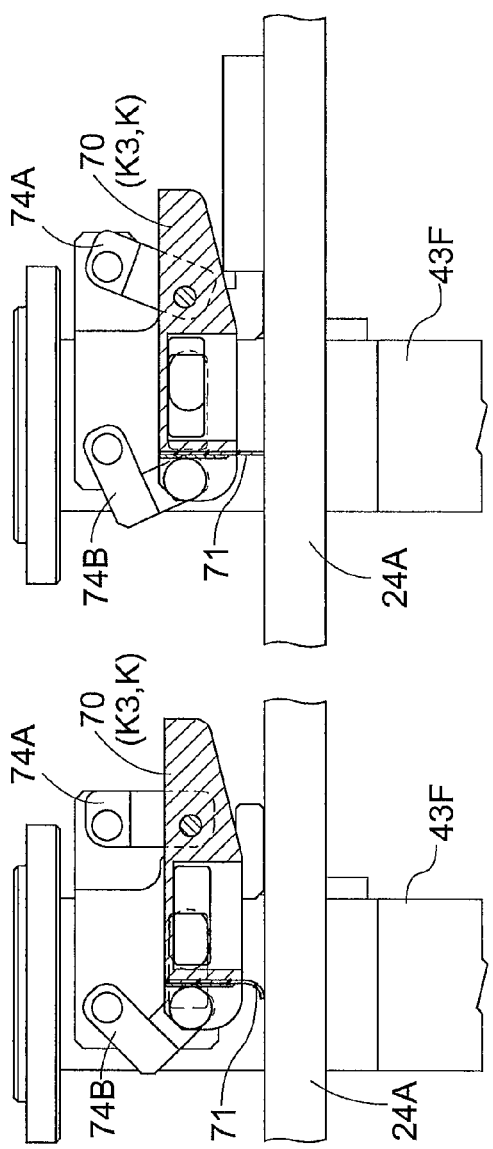

CLEANING DEVICE FOR CEILING TRANSPORT FACILITY AND OPERATION METHOD THEREOF

BACKGROUND OF THE INVENTION

1. Field of the Invention

The present invention relates to a cleaning device for a ceiling transport facility and an operation method thereof, with the facility comprising a travelling guide portion for a transport carriage, the travelling guide portion being provided on a ceiling side, a cleaning carriage that can travel along the travelling guide portion wherein the cleaning carriage is provided with a plurality of cleaning suction portions for performing suctioning action on a plurality of locations to be cleaned in the travelling guide portion and a vacuum cleaner connected to the plurality of cleaning suction portions for communication therewith.

2. Description of the Related Art

The cleaning device for the ceiling transport facility is a device that cleans a plurality of locations in the travelling guide portion to be cleaned with cleaning suction portions by causing the cleaning carriage along with a travelling guide.

More specifically, such a ceiling transport facility is provided in clean rooms, such as a down-flow type clean room, and is used to transport, for example, articles in a clean environment, such as transporting containers for holding silicon substrates.

Although the ceiling transport facility may be provided in a clean room, there are locations along the travelling guide portion which dusts tend to adhere to and accumulate on.

And if the dust adhered and accumulated in the travelling guide portion is neglected, and not removed, it causes a problem that it contaminates the space in which the ceiling transport facility is installed as the adhered and accumulated dust drifts away from the travelling guide portion because of the air flow created as the transport carriage travels or by the vibration of the travelling guide portion.

Thus, a cleaning carriage is caused to travel along the travelling guide at suitable times to clean the dust adhered and accumulated on the travelling guide portion.

More specifically, a number of locations which dust tends to adhere to and accumulate on in the travelling guide portion are designated to be the plurality of locations to be cleaned. And by providing the cleaning carriage with a plurality of cleaning suction portions that correspond to those locations to be cleaned, the plurality of locations to be cleaned in the travelling guide portion can be cleaned with the cleaning suction portions by causing the cleaning carriage to travel along the travelling guide.

As an example of such a conventional cleaning device for a ceiling transport facility, there was a device in which a plurality of cleaning suction portions are simply communicated to a vacuum cleaner and which is configured such that, when the vacuum cleaner is operated, all of the plurality of cleaning suction portions perform the sucking or suctioning action simultaneously. (See, for example, JP Publication of Application No. 2000-271552.)

Incidentally, the cleaning device for the ceiling transport facility disclosed in JP Publication No. 2000-271552 is configured to be a cleaning carriage by providing a transport carriage with a plurality of dust suction nozzles that function as the plurality of cleaning suction portions, and by mounting a vacuum type cleaner that functions as a suction type cleaner instead of an article to be transported, and by connecting the vacuum type cleaner with the plurality of dust suction nozzles using ducts etc.

That is, a transport carriage that is normally used to transport articles is converted to perform cleaning work by fitting it with a plurality of dust suction nozzles and by mounting a vacuum type cleaner when performing a cleaning work.

In the conventional cleaning devices for ceiling transport facility, a vacuum cleaner is simply communicated to the plurality of cleaning suction portions such that all of the plurality of cleaning suction portions perform the suctioning action simultaneously when the vacuum cleaner is operated; thus, the suction power of the plurality of cleaning suction portions becomes insufficient, so that sufficient cleaning may not be possible.

More specifically, because the cleaning carriage travels using the travelling guide portion for the transport carriages and transports a vacuum cleaner instead of an article to be transported, the vacuum cleaner to be mounted to the cleaning carriage needs to have a weight that is about the same as that of an article.

Therefore, the vacuum cleaner with a large suction power cannot be mounted due to the weight limitation even where a large vacuum cleaner having a greater suction power is desired to provide a greater suction power for the plurality of cleaning suction portions. Thus the suction power of the plurality of cleaning suction portions ended up being insufficient, so that sufficient cleaning may not be possible.

The shortage of the suction power became more noticeable especially when there is a large number of locations to be cleaned in the travelling guide portion and when all of the large number of cleaning suction portions that correspond to those locations to be cleaned perform the suctioning action simultaneously.

Incidentally, since the vacuum cleaner mounted to the cleaning carriage mounts a battery for actuating electric power, the vacuum cleaner tends to have a low suction capacity for its weight. This is also a cause for insufficient suction power of the plurality of cleaning suction portions.

More specifically, the travelling guide portion in a ceiling transport facility typically holds electricity supply lines for contactlessly supplying electric power to transport carriages. And transport carriages travel under the electric power supplied from the electricity supply lines, and operate its article transfer with the electric power supplied from the electricity supply lines when stopped.

Therefore, while a cleaning carriage can travel using the electric power supplied from the electricity supply lines, the electric power supplied from the electricity supply lines is consumed for moving the cleaning carriage and there is no surplus electric power left to operate the suction vacuum cleaner when cleaning carriage is traveling. Accordingly, the suction vacuum cleaner needs to have a heavy battery. As a result, the vacuum cleaner has a low suction capacity for its weight as described above.

SUMMARY OF THE INVENTION

The present invention was made in light of the state of the art described above, and its object is to provide a cleaning device for a ceiling transport facility in which a plurality of locations to be cleaned can be cleaned appropriately while avoiding having insufficient suction power for the plurality of cleaning suction portions.

A cleaning device for a ceiling transport facility in accordance with the present invention comprises: a travelling guide portion for a transport carriage, the travelling guide portion being provided on a ceiling side; a cleaning carriage that can travel along the travelling guide portion; a plurality of cleaning suction portions provided to the cleaning carriage for performing suctioning action on a plurality of locations to be cleaned in the travelling guide portion, the plurality of cleaning suction portions being divided into a plurality of functioning units; a vacuum cleaner provided to the cleaning carriage and connected to the plurality of cleaning suction portions for communication therewith; and interrupting mechanism configured to selectively permit and prevent the communication of each of the plurality of functioning units with the vacuum cleaner.

That is, each functioning unit of the plurality of cleaning suction portions can be separately switched to a state in which the functioning unit is in communication with the vacuum cleaner by selectively allowing and preventing communication of each of the plurality of functioning units with the vacuum cleaner with the interrupting means.

That is, for each functioning unit, it is possible to allow communication between a cleaning suction portion belonging to one of the plurality of the functioning units and the vacuum cleaner and to prevent communication between a cleaning suction portion belonging to another functioning unit and the vacuum cleaner.

Therefore, when cleaning the travelling guide portion, firstly, the cleaning carriage is caused to travel along the travelling guide portion while allowing or permitting communication between a cleaning suction portion belonging to one of the plurality of the functioning units and the vacuum cleaner and preventing communication between a cleaning suction portion belonging to another functioning unit and the vacuum cleaner, in order to clean the location to be cleaned that corresponds to the cleaning suction portion that is in communication with the vacuum cleaner.

Next, the cleaning carriage is caused to travel along the travelling guide portion while allowing communication between a cleaning suction portion belonging to one of the plurality of functioning units for a location to be cleaned that has not been cleaned and the vacuum cleaner and preventing communication between the cleaning suction portions belonging to other functioning units and the vacuum cleaner, in order to clean the location to be cleaned that corresponds to the cleaning suction portion that is in communication with the vacuum cleaner.

And the process of cleaning the locations to be cleaned while switching the functioning unit among the plurality of functioning units that is in communication with the vacuum cleaner is repeated until all of the plurality of the locations to be cleaned are cleaned.

As such, since the plurality of locations to be cleaned in the travelling guide portion are cleaned with only a part of the plurality of cleaning suction portions being in communication with the vacuum cleaner by selectively permitting and preventing communication of each of the plurality of functioning units with the vacuum cleaner, the plurality of locations to be cleaned can be cleaned appropriately while avoiding having insufficient suction power for the plurality of cleaning suction portions even when the suction capacity of the vacuum cleaner is not sufficient to allow all of the plurality of the cleaning suction portions to operate with sufficient suction power at once.

In short, the configuration in accordance with the present invention described above makes it possible to provide a cleaning device for a ceiling transport facility in which a plurality of locations to be cleaned can be cleaned appropriately while avoiding having insufficient suction power for the plurality of cleaning suction portions.

An operation method of the cleaning device is deemed within the scope of the present invention. More particularly, an operation method of a cleaning device for a ceiling transport facility having a travelling guide portion provided on a ceiling side; and a cleaning carriage that can travel along the travelling guide portion; wherein the cleaning carriage is provided with a plurality of cleaning suction portions for performing suctioning action on a plurality of locations to be cleaned in the travelling guide portion and a vacuum cleaner connected to the plurality of cleaning suction portions for communication therewith; wherein the plurality of cleaning suction portions are divided into a plurality of functioning units including at least a first functioning unit and a second functioning unit, the operation method of the cleaning device for the ceiling transport facility comprising: allowing communication between the vacuum cleaner and the first functioning unit and preventing communication between the vacuum cleaner and the second functioning unit; causing the cleaning carriage to travel along the travelling guide portion while allowing communication between the vacuum cleaner and the first functioning unit and preventing communication between the vacuum cleaner and the second functioning unit; allowing communication between the vacuum cleaner and the second functioning unit and preventing communication between the vacuum cleaner and the first functioning unit; and causing the cleaning carriage to travel along the travelling guide portion while allowing communication between the vacuum cleaner and the second functioning unit and preventing communication between the vacuum cleaner and the first functioning unit.

DESCRIPTION OF THE PREFERRED EMBODIMENTS

The embodiment of the present invention is described next with reference to the drawings.

The ceiling transport facility is described first.

Figure 2:
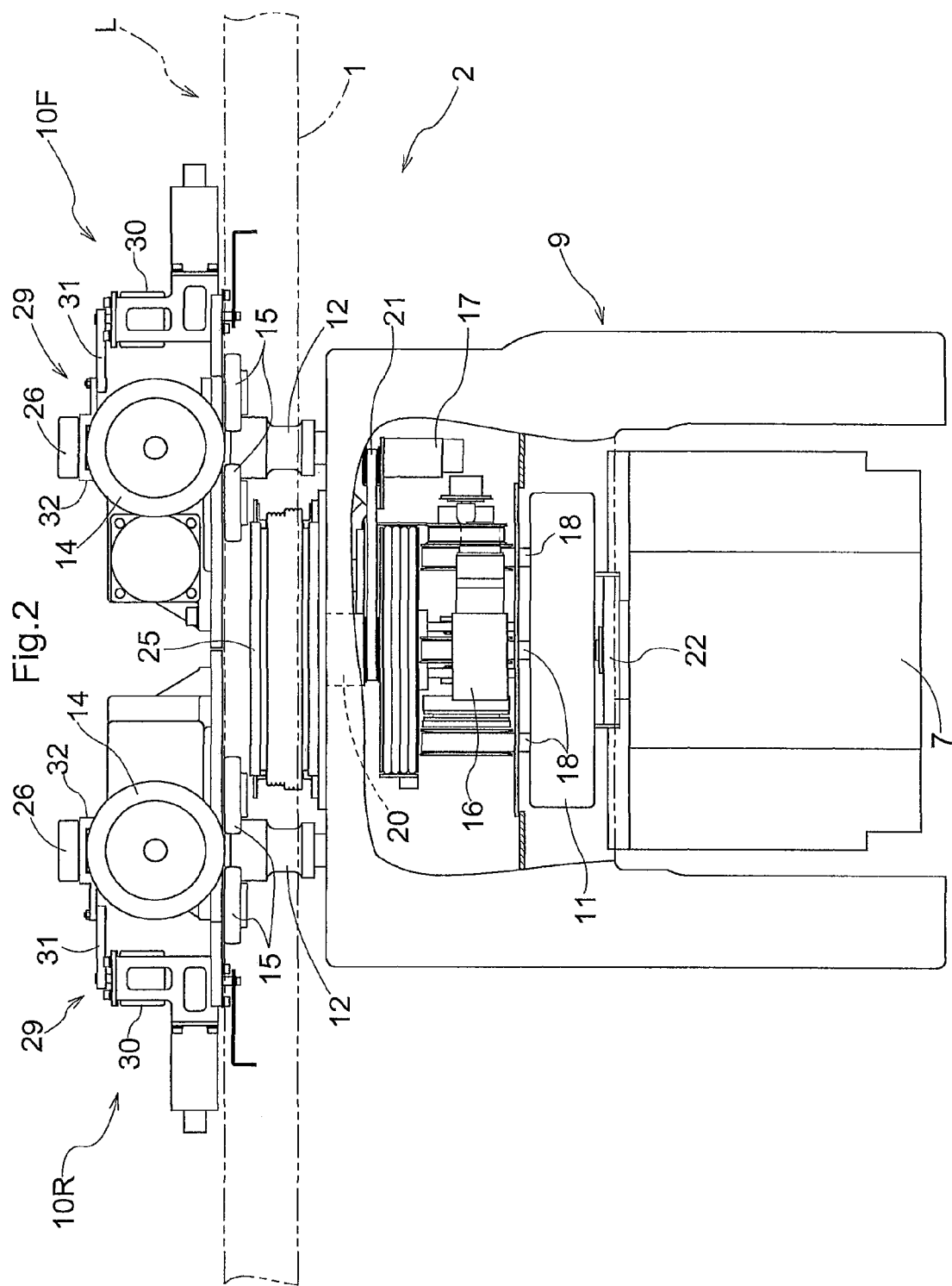
FIG. 2 is a side view of a transport carriage.
Figure 3:
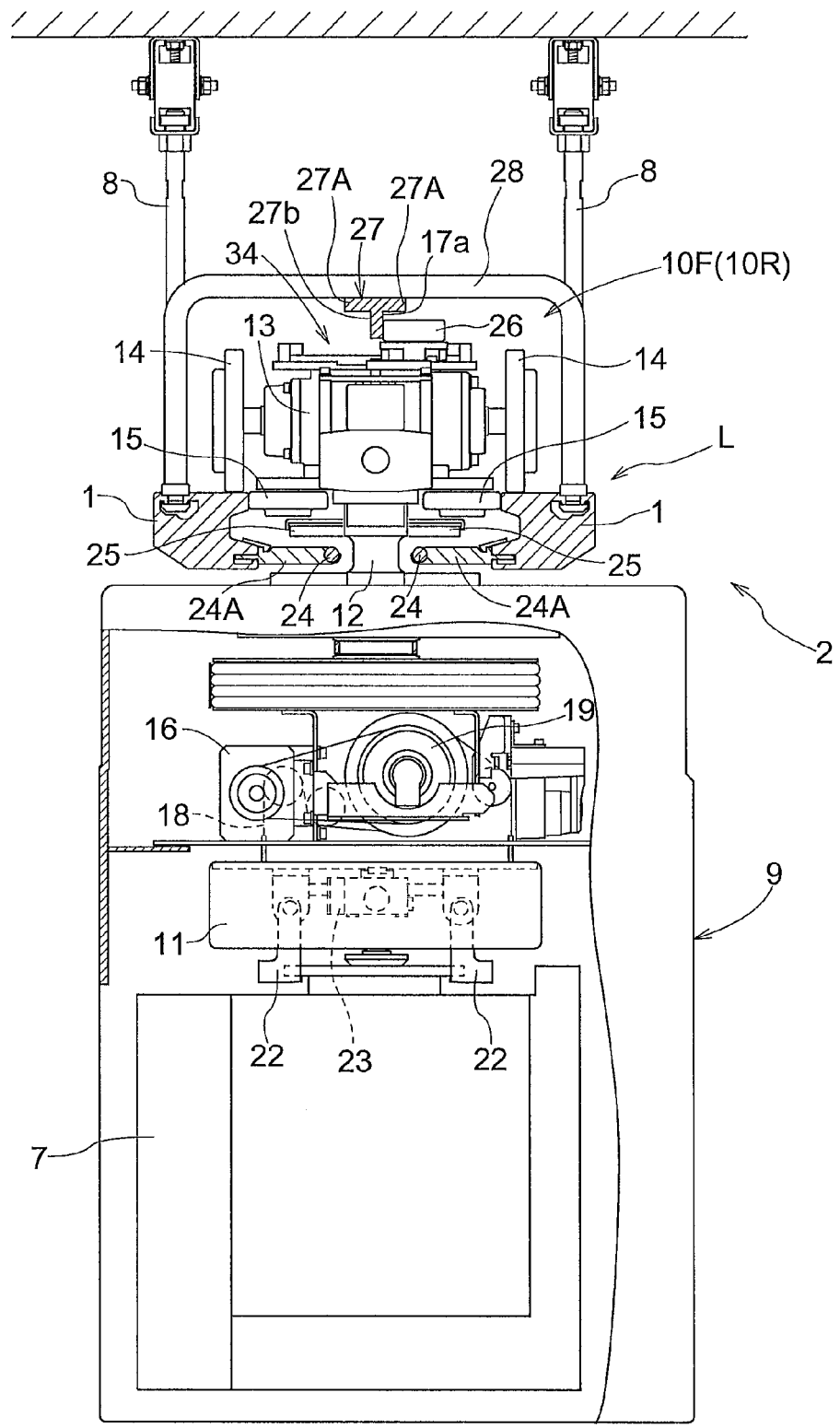
FIG. 3 is a front view of the transport carriage.
Figure 4:
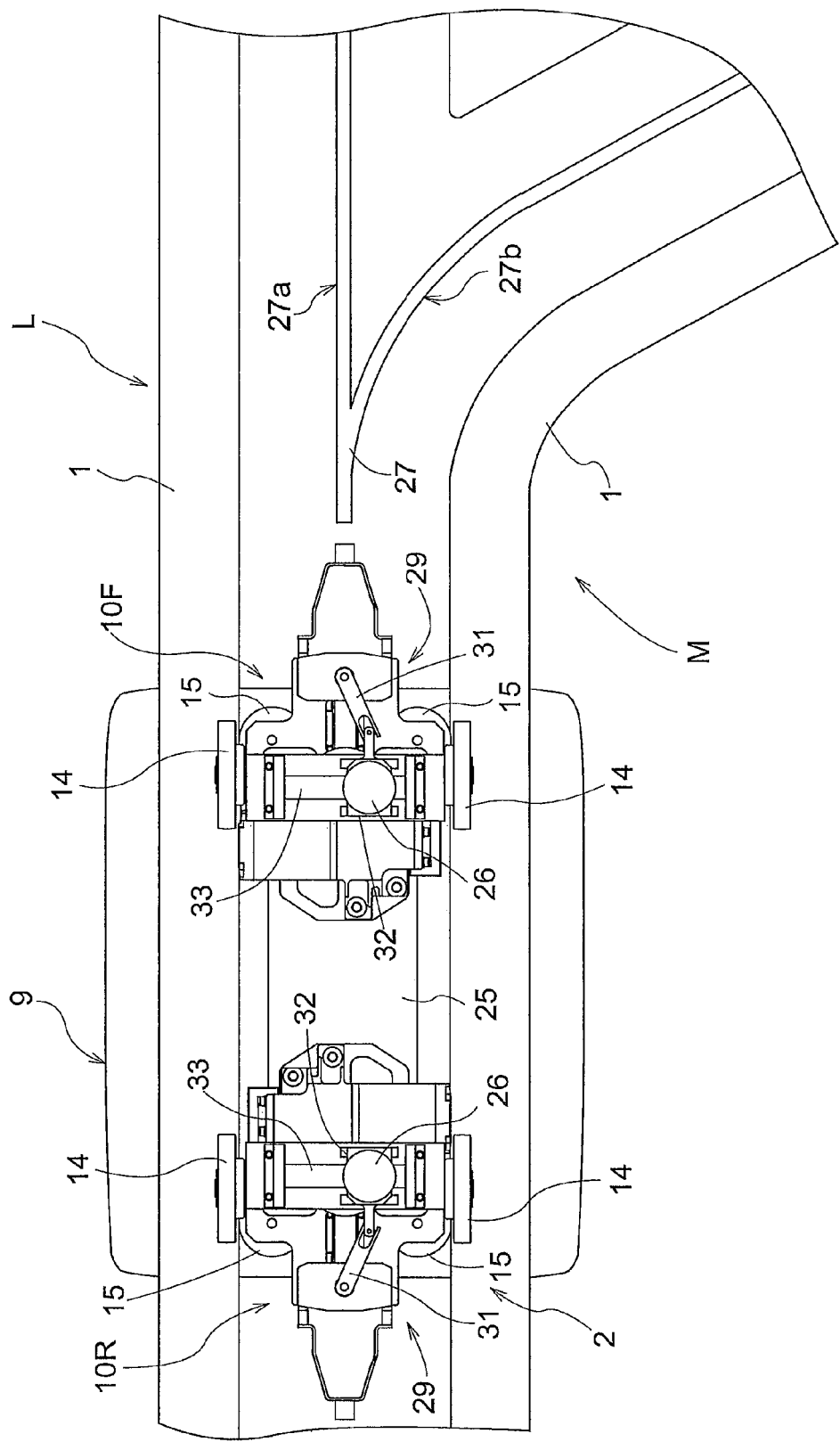
FIG. 4 is a plan view showing the state of the transport carriage in a diverging portion.

As shown in FIGS. 2-4, the travelling guide portion L having the travel rails 1 is provided on the ceiling side (i.e. supported by the ceiling in the present embodiment). And transport carriages 2 that travel along the travelling guide portion L are provided.

Figure 1:
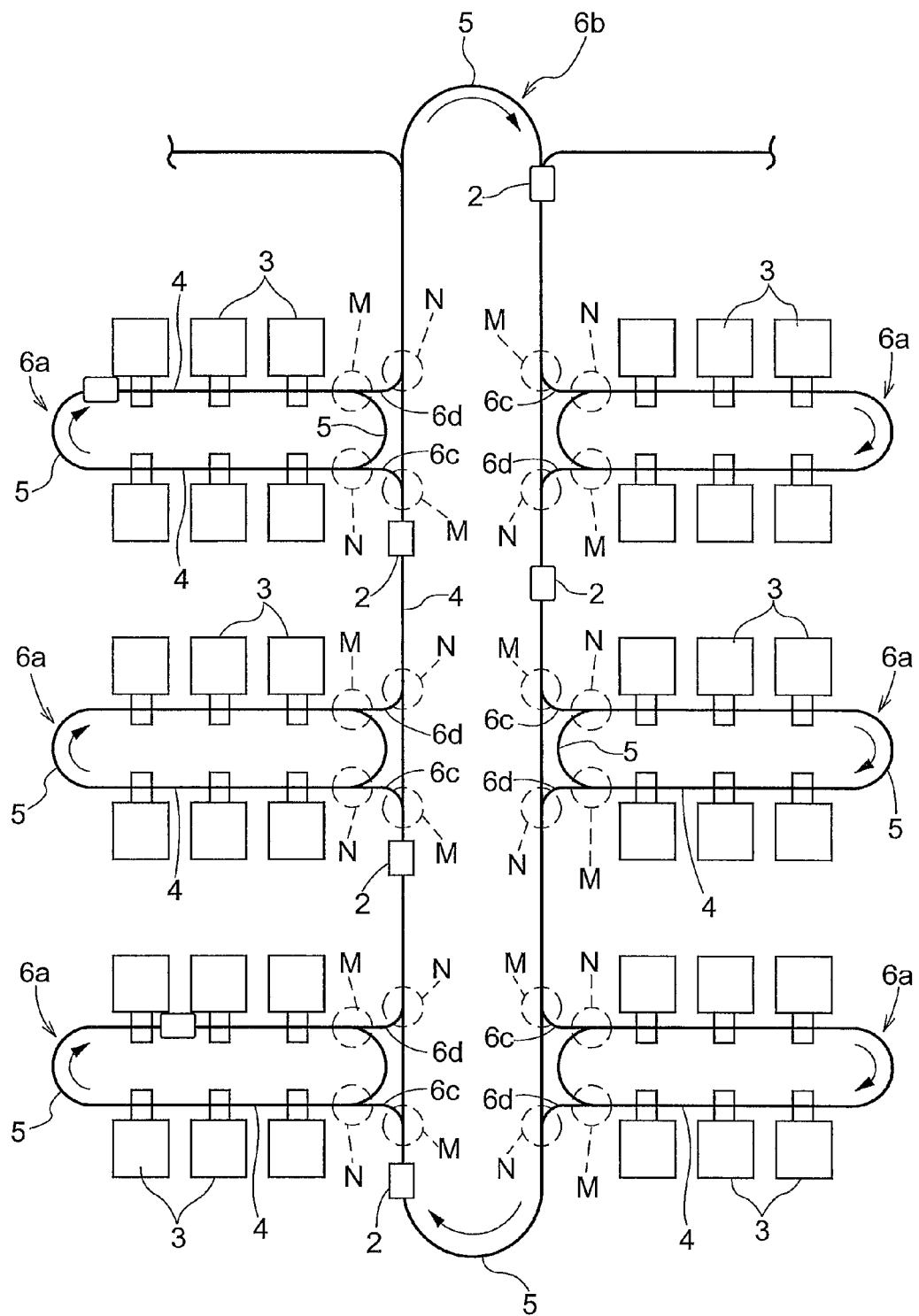
FIG. 1 is a diagrammatic plan view showing a predetermined travel path.

That is, as shown in FIG. 1, predetermined travel paths 6a, 6b for the transport carriages 2 are installed to extend along or by way of a plurality of article processors 3. And the travelling guide portions L are installed along the predetermined travel paths.

The predetermined travel paths are formed by combining straight path portions 4 and arc-shaped (or curved) path portions 5. And the transport carriages 2 are configured to travel in a fixed direction (directions shown by arrows in FIG. 1) along the predetermined travel paths.

Incidentally, in the present embodiment, the predetermined travel paths include, as principal paths, a plurality of loop-shaped secondary travel paths 6a each of which extends along or by way of a plurality of article processors 3, and a loop-shaped primary travel path 6b.

And the predetermined travel paths also include diverging connecting paths 6c for leading or guiding a transport carriage 2 that has been traveling on the primary travel path 6b into a secondary travel path 6a as well as converging connecting paths 6d for leading or guiding a transport carriage 2 that has been traveling on a secondary travel path 6a into the primary travel path 6b.

And the facility is configured such that transport carriages 2 travel over the primary travel path 6b and the plurality of secondary travel paths 6a by virtue of the fact that transport carriages 2 that travel on the primary travel path 6b diverge into a diverging connecting path 6c at a diverging portion M, the fact that the transport carriages 2 that travel on a diverging connecting path 6c converges into a secondary travel path 6a at a converging portion N, the fact that the transport carriages 2 that travel on the secondary travel path 6a diverge into a converging connecting path 6d at a diverging portion M, and by the fact that the transport carriages 2 that travel on the converging connecting path 6d converge or merge into the primary travel path 6b at a converging portion N.

As shown in FIG. 1, a plurality of transport carriages 2 are provided in the present embodiment. And, as shown in FIGS. 2 and 3, each transport carriage 2 is configured to transport a container for holding or storing semiconductor substrates as an article 7.

More specifically, as the plurality of article processors 3, two or more kinds of article processors 3 exist that perform different processing to semiconductor substrates. And each transport carriage 2 transports an article 7 received from an article processor 3 to another article processor 3 that performs a different processing.

In addition, while not shown, storage portions for temporarily storing articles 7 are provided in many cases. And when such temporary storage locations are provided, transport carriages 2 transport articles 7 to the storage portions and transport articles received from the storage portions to the article processors 3.

Travel rails 1 of the travelling guide portion L are installed such that they extend along a predetermined travel path and are suspended from the ceiling with travel rail supports 8 as shown in FIG. 3. In addition, as shown in FIGS. 3 and 4, a pair of right and left travel rails 1 are provided such that they are spaced apart from each other along a lateral direction of the transport carriage 2.

Incidentally, in the following description, the lateral direction of the transport carriage 2 is referred to as the carriage lateral direction: the fore and aft direction of the transport carriage 2 is referred to as the carriage fore and aft direction: and, the vertical direction of the transport carriage 2 is referred to as the carriage vertical direction.

As shown in FIGS. 2 and 3, each transport carriage 2 includes a vehicle main body 9 located under the travelling guide portion L, and a pair of front and back travel portions 10F, 10R that travel along the travelling guide portion L. And the vehicle main body 9 has a grip portion 11 for suspending and gripping an article 7.

And connecting shafts 12 that extend downwardly in the vertical direction from the pair of front and back travel portions 10F, 10R are provided such that they extend downwardly through the space between the pair of right and left travel rails 1. And the vehicle main body 9 is suspended from and supported by the pair of front and back travel portions 10F, 10R through or by means of the connecting shafts 12 such that the vehicle main body 9 can be rotated with respect to the front and back travel portions 10F, 10R, about the axes of the connecting shafts 12.

Incidentally, in present embodiment, the vehicle main body 9 of the transport carriage 2 defines a suspended portion that is suspended from and supported by the pair of front and back travel portions 10F, 10R through or by means of the connecting shafts 12. And the vehicle main body 9 which is the suspended portion defines an article support for the article 7 to be transported.

Travel wheels 14 that are driven and rotated by a electric drive motor 13 are provided to each of the pair of front and back travel portions 10F, 10R such that they travel on travelling surfaces defined on the top surfaces of the pair of front and back travel rails 1.

In addition, guide wheels 15 that can freely rotate about axes that extend along the carriage vertical direction are provided such that they are in contact with inward side faces of the pair of right and left travel rails 1.

One travel wheel 14 is provided on each side in the lateral direction in each of the pair of travel portions 10F, 10R, and two pairs of right and left guide wheels 15 are provided to each of the pair of front and back travel portions 10F, 10R such that the pairs are spaced apart from each other in the carriage fore and aft direction.

Therefore, the transport carriage 2 is configured to travel along the travel rails 1 by virtue of the fact that the travel wheels 14 of the pair of front and back travel portions 10F, 10R are driven and rotated while the position in the carriage lateral direction is restricted by virtue of the fact that the guide wheels 15 of the pair of front and back travel portions 10F, 10R are guided by the pair of travel rails 1.

In addition, the transport carriage 2 is configured to be able to travel well also in an arc-shaped path portion 5 in the predetermined travel paths by virtue of the fact that the pair of front and back travel portions 10F, 10R can flex or change directions with respect to the vehicle main body 9 about the axes of the connecting shafts 12 (i.e., about axes extending in the carriage vertical direction).

The vehicle main body 9 has a forward end and a back end in the carriage fore and aft direction that extend downwardly and is formed in the shape of an inverted "U" that opens downwardly (or a bracket shape that opens downwardly). And the grip portion 11 is provided between the forward end and the back end extending downwardly.

And the vehicle main body 9 includes an electric vertical movement motor 16 for vertically moving or raising and lowering the grip portion 11, and an electric turning motor 17 for rotating the grip portion 11 about a vertical axis.

More specifically, the vertical movement motor 16 is configured to drive and rotate a rotating drum 19—to which belts 18, that function as wire elements, are spooled—in one direction or in the opposite direction to spool or feed out the belts 18 in order to vertically move the grip portion 11 between a raised position and a lowered position.

Here, the raised position is a position at which the grip portion 11 is close to the vehicle main body 9 as shown in FIGS. 2 and 3. And the lowered position, while not shown, is a position at which the grip portion 11 is close to transfer stations of article processors 3.

In the present embodiment, the article 7 is located between the forward end portion and the back end portion of the vehicle main body 9 when the grip portion 11 is in the raised position.

The grip portion 11 is connected to the vehicle main body by means of a rotation shaft 20 (see FIG. 2) that extends downwardly from an upper end portion of the vehicle main body 9 such that the grip portion 11 can be rotated about a vertical axis 9.

And the grip portion 11 is rotated about the vertical axis as the turning motor 17 drives and rotates the rotation shaft 2 about the vertical axis through the rotation power transfer portion 21.

The rotation power transfer portion 21 includes the first pulley that is rotated by the turning motor 17, the second pulley fixed to the rotation shaft 20, and a belt that extends between these first and second pulleys.

The grip portion 11 has a gripper 22 for gripping an article 7 and is configured to switch the gripper 22 between a gripping attitude for gripping an article 7 and a grip release attitude for releasing the grip by means of an electric gripper motor 23.

FIG. 3 shows the state where the gripper 22 is switched to the gripping attitude.

The transport carriage 2 includes a carriage side controller (not shown) that controls the operation of the transport carriage 2 by controlling the traveling operation of the pair of front and back travel portions 10F, 10R, the vertical movement operation of the grip portion 11, and the attitude switching operation of the gripper 22, etc.

And, the carriage side controller is configured to perform a transport process in which an article 7 is transported from a station of transport origin to a station of transport destination specified in a transport command when the carriage side controller receives the transport command which specifies the station of transport origin and the station of the transport destination from the facility management computer which manages operation of the plurality of transport carriages 2 by wireless communication etc.

Various controllers, computers, control means, and other members that have control functions, that are described in the present specification, include a CPU, memory, communication units, etc. And the algorithms for performing the functions described in the present specification are stored in the memory.

More specifically, each transport carriage 2 has various sensors such as a sensor for detecting a target stopping position that is associated with each station and a sensor for detecting the traveled distance of the transport carriage 2 from a reference point.

And the carriage side controller is configured to control traveling operation of the pair of front and back travel portions 10F, 10R based on the detected information from these various sensors to travel to the specified station of transport origin, and to travel from the specified station of transport origin to the station of transport destination, and is also configured to control vertical movement operation of the grip portion 11 and the attitude switching operation of the gripper 22 at the station of transport origin to receive an article 7 from the station of transport origin, and to control the vertical movement operation of the grip portion 11 and the attitude switching operation of the gripper 22 at the station of transport destination to unload the article 7 to the station of transport destination.

The transport carriage 2 is configured to be powered by electric power supplied from outside of the carriage 2.

That is, as shown in FIG. 3, a pair of right and left electricity supply lines 24 for supplying driving electric power to the transport carriage 2 are provided to the travelling guide portion L such that they extend along the predetermined travel path similarly with the pair of right and left travel rails 1.

More specifically, each of the pair of right and left electricity supply lines 24 is fixedly supported by a distal end portion of the holding portion 24A provided at a lower end portion of each of the pair of right and left travel rails 1 such that the holding portion 24A extends inwardly in the carriage lateral direction.

In addition, as shown in FIGS. 2 and 3, the vehicle main body 9 of the transport carriage 2 includes a single power receiving portion (or power receiving coil) 25 to which driving electric power is supplied contactlessly or without contact from the right and left electricity supply lines 24 with the power receiving portion 25 located between the pair of front and back connecting shafts 12.

And alternating currents are applied to the electricity supply lines 24 to generate magnetic field. And the magnetic field generates driving electric power in the power receiving portion 25 to supply electric power contactlessly to the transport carriage 2.

Guide wheels 26 that are rotated about vertically extending axes (axes extending along the carriage vertical direction) are provided in an upper portion of the transport carriage 2. And guide rails 27 for guiding the guide wheels 26 are provided in the travelling guide portion L at locations that correspond to the diverging portions M and the converging portions N.

As shown in FIG. 3, the guide rails 27 are supported by frames 28 which have a shape of an inverted "U", which are supported by the travel rails 1, and which are installed at proper intervals along the longitudinal direction of the travel rails 1.

Incidentally, FIG. 4 shows a diverging portion M in a secondary travel path 6a as a representative example and a drawing for the converging portion N is omitted.

The guide rail 27 guides the guide wheels 26 to set the direction of the diverging travel of the transport carriage 2 in a diverging portion M, and guides the guide wheels 26 to maintain the proper attitude of the transport carriage 2 even when the travel rail 1 is located only on one side in the carriage lateral direction in diverging portions M and converging portions N.

To describe in more detail, since, in the travel path in a diverging portion M and a converging portion N, there is a path portion in which the travel rail 1 is provided only on one side in the lateral direction of the transport carriage 2 to allow the connecting shafts 12 to pass through, the proper attitude of the transport carriage 2 is maintained by guiding the guide wheels 26 with the guide rail 27.

In addition, it is necessary, in a diverging portion M, to switch between a state in which the transport carriage 2 is allowed to travel along the straight path portion 4 and the state in which the carriage 2 is allowed to travel along the arc-shaped path portion 5; accordingly, the diverging direction of the transport carriage 2 can be chosen by guiding the guide wheels 26 with the guide rail 27.

As shown in FIG. 4, the guide rail 27 is formed to have a shape that splits into two parts in plan view, and is configured to have a first guide surface 27a that functions in the straight path portion 4, a second guide surface 27b that functions in the arc-shaped path portion 5 as guide surfaces for guiding the guide wheels 26.

Each of the pair of front and back travel portions 10F, 10R of the transport carriage 2 has a guide wheel 26.

And each of the pair of front and back travel portions 10F, 10R has guide surface switching means 29 for changing the position of the guide wheel 26 with respect to the guide rail 27 in the carriage lateral direction to switch between a state in which the guide wheel 26 is guided by the first guide surface 27a and a state in which the guide wheel 26 is guided by the second guide surface 27b.

As shown in FIG. 4, the guide surface switching means 29 includes a pivot arm 31 which can be pivoted about a vertical axis by an actuator 30 (see FIG. 2) such as a motor, a movable body 32 provided in the distal end portion of the pivot arm 31, and a travel guide portion 33 which has a rail for guiding the movable body 32 for movement in the carriage lateral direction. And the guide wheel 26 is supported by the distal end portion of the movable body 32 such that the guide wheel 26 can rotate about a vertical axis.

And the guide surface switching means 29 is configured to switch the guide surface for guiding the guide wheel 26 between the first guide surface 27a and the second guide surface 27b by pivoting the pivot arm 31 with the actuator 30 to change the position of the guide wheel 26 in the carriage lateral direction.

Incidentally, FIG. 3 shows the state where the guide surface switching means 29 is switched to the state of guiding the guide wheel 26 by the first guide surface 27a of the guide rail 27. And FIG. 4 shows the state where the guide surface switching means 29 is switched to the state of guiding the guide wheel 26 by the second guide surface 27b of the guide rail 27.

Although a drawing is omitted for the converging portion N, a guide rail 27 having a shape that splits into two parts in plan view is provided similar to the diverging portion M described above.

And the guide surface switching means 29 is configured to switch the guide surface for guiding the guide wheel 26 between the first guide surface 27a and the second guide surface 27b by pivoting the pivot arm 31 with the actuator 30 to change the position of the guide wheel 26 in the carriage lateral direction.

Incidentally, as shown in FIG. 3, overhang portions 27A that project in the lateral direction as seen along the longitudinal direction of the guide rails are provided in the upper portion of the guide rail 27 for reinforcement. And the undersurface of this overhang portion 27A is continuous with the upper end of the first guide surface 27a or the second guide surface 27b.

A cleaning device described below is provided in the ceiling transport facility thus configured since there is a possibility that dust may adhere to and accumulate in the travelling guide portion L and more specifically the traveling surfaces of the pair of right and left travel rails 1, the top surface of each of the pair of right and left holding portions 24A associated with the respective one of the pair of right and left electricity supply lines 24, and the first and second guide surfaces 27a, 27b of the guide rail 27.

That is, as shown in FIGS. 5-8, a cleaning carriage W is provided which can travel along the travelling guide portion L.

And the cleaning carriage W includes a plurality of cleaning suction portions K that perform suctioning action on, or vacuum, a plurality of locations to be cleaned, with the traveling surfaces of the pair of right and left travel rails 1, the top surface of each of the pair of right and left holding portions 24A associated with the respective one of the pair of right and left electricity supply lines 24, and the first and second guide surfaces 27a, 27b of the guide rail 27, of the travelling guide portion L designated as a plurality of locations to be cleaned in the travelling guide portion L.

In addition, a vacuum cleaner G, which is in communication with the plurality of cleaning suction portions K, is provided to the cleaning carriage W.

And by causing the cleaning carriage W to travel along the travelling guide portion L with the vacuum cleaner G turned on, dust can be removed that adhered to and accumulated on the traveling surfaces of the pair of right and left travel rails 1, the top surface of each of the pair of right and left holding portions 24A associated with the respective one of the pair of right and left electricity supply lines 24, and the first and second guide surfaces 27a, 27b of the guide rail 27, of the travelling guide portion L.

Further, the plurality of cleaning suction portions K are divided into a plurality of functioning units. And the cleaning carriage W includes interrupting means E (or interrupting mechanism) for selectively interrupting and allowing (i.e. preventing and permitting) the communication between each of the plurality of functioning units and the vacuum cleaner G (i.e. the communication of each of the plurality of functioning units with the vacuum cleaner). (See FIGS. 10 and 18).

More specifically, in the present embodiment, the plurality of cleaning suction portions K are divided into functioning units such that each of the following is a functioning unit: a pair of right and left cleaning suction portions K for cleaning the traveling surfaces of the pair of right and left travel rails 1 (referred to, hereinafter, as the first cleaning portions K1); a cleaning suction portion K for cleaning the first guide surface 27a and the second guide surface 27b of the guide rail 27 (referred to, hereinafter, as the second cleaning portion K2); and a pair of right and left cleaning suction portions K for cleaning the top surfaces of the holding portions 24A for the pair of right and left electricity supply lines 24 (referred to, hereinafter, as the third cleaning portions K3).

The traveling surfaces of the travel rails 1, the first guide surface 27a and the second guide surface 27b, and the top surface of the holding portion 24A are all examples of a suctioning target surface.

Therefore, in the present embodiment, the cleaning device is configured to clean the travelling guide portion L during which the interrupting means E is operated to switch among a state in which the traveling surfaces of the pair of right and left travel rails 1 of the travelling guide portion L are cleaned, a state in which the first guide surface 27a and the second guide surface 27b of the guide rail 27 are cleaned, and a state in which the top surfaces of the pair of right and left holding portions 24A corresponding to respective ones of the pair of right and left electricity supply lines 24 are cleaned. The details are described below.

Incidentally, in the present embodiment, the plurality of secondary travel paths 6a of the travelling guide portion L are cleaned using the carriage W whereas the primary travel path 6b is not cleaned.

And when cleaning the plurality of secondary travel paths 6a, the transport carriages 2 are removed from the secondary travel path 6a to be cleaned among the plurality of secondary travel paths 6a and the cleaning carriage W is mounted on the secondary travel path 6a to be cleaned. And the cleaning carriage W is caused to travel on the secondary travel path 6a to be cleaned.

This procedure is repeated for each of the plurality of secondary travel paths 6a one by one.

It is noted that when transport carriages 2 are allowed to travel on all of the plurality of secondary travel paths 6a, the cleaning carriage W is removed from all of the secondary travel paths 6a.

Incidentally, while not shown, a portion of the secondary travel path 6a, i.e., a portion of the pair of right and left travel rails 1 is configured to be raised and lowered or vertically moved, with a cleaning carriage W mounted (i.e., supported) thereon, between a raised position at which it functions as the travel rail 1 and a carriage mounting-and-removing position which is a lowered position near the floor. And the cleaning carriage W can be mounted on or removed from the secondary travel path 6a by vertically moving this portion of the travel rails 1.

Figure 5:
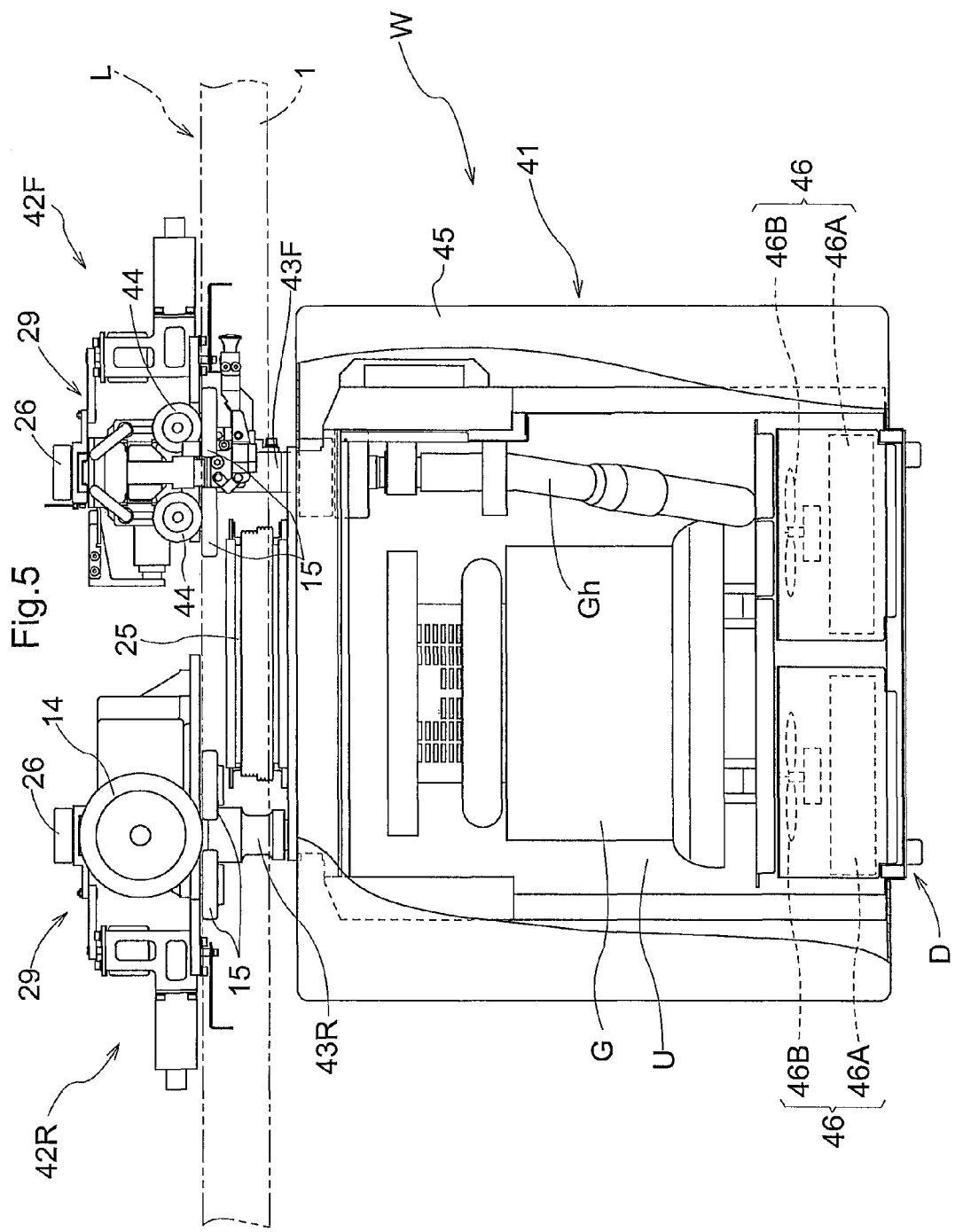
FIG. 5 is a side view of a cleaning carriage.
Figure 6:
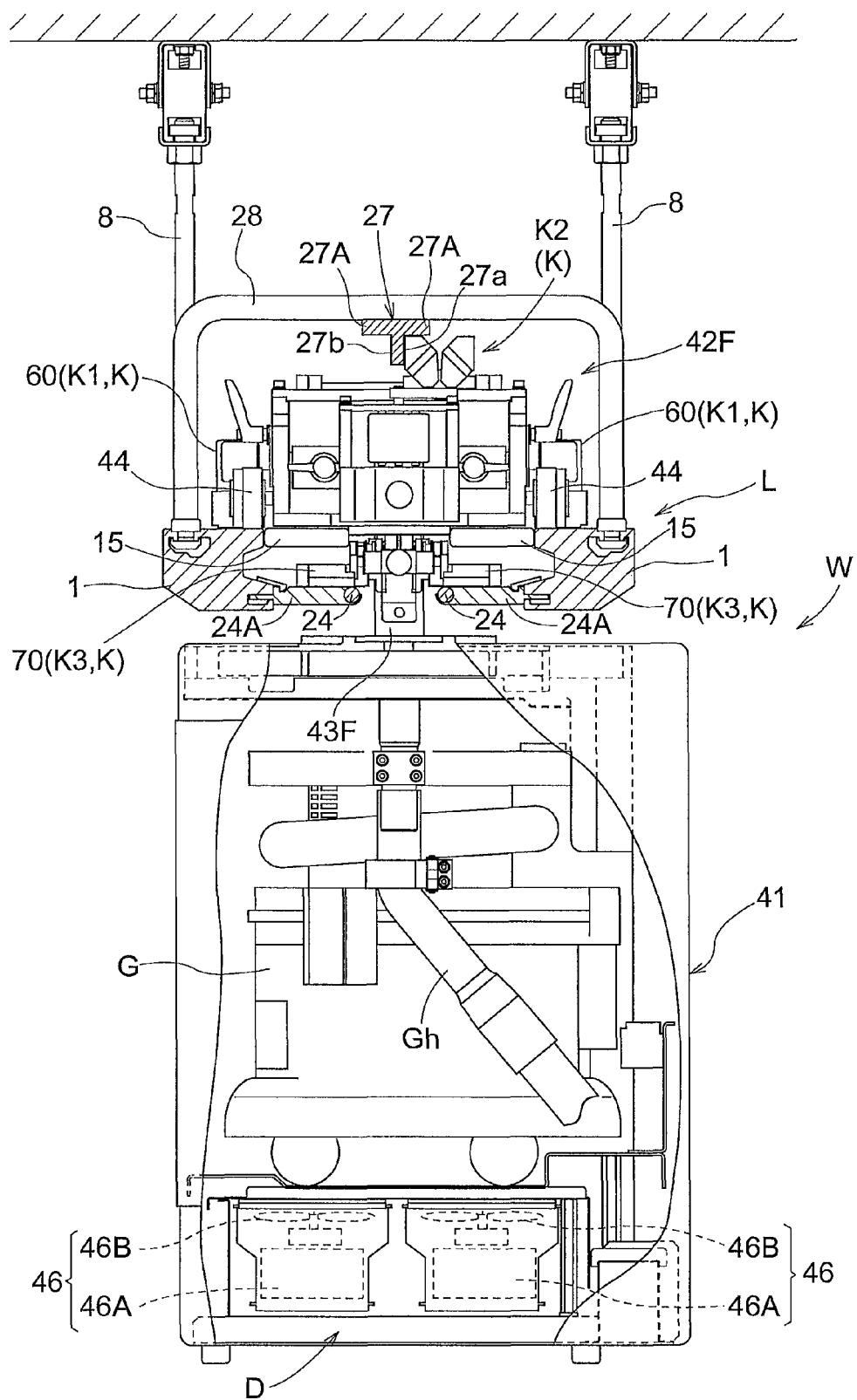
FIG. 6 is a front view of the cleaning carriage.
Figure 7:
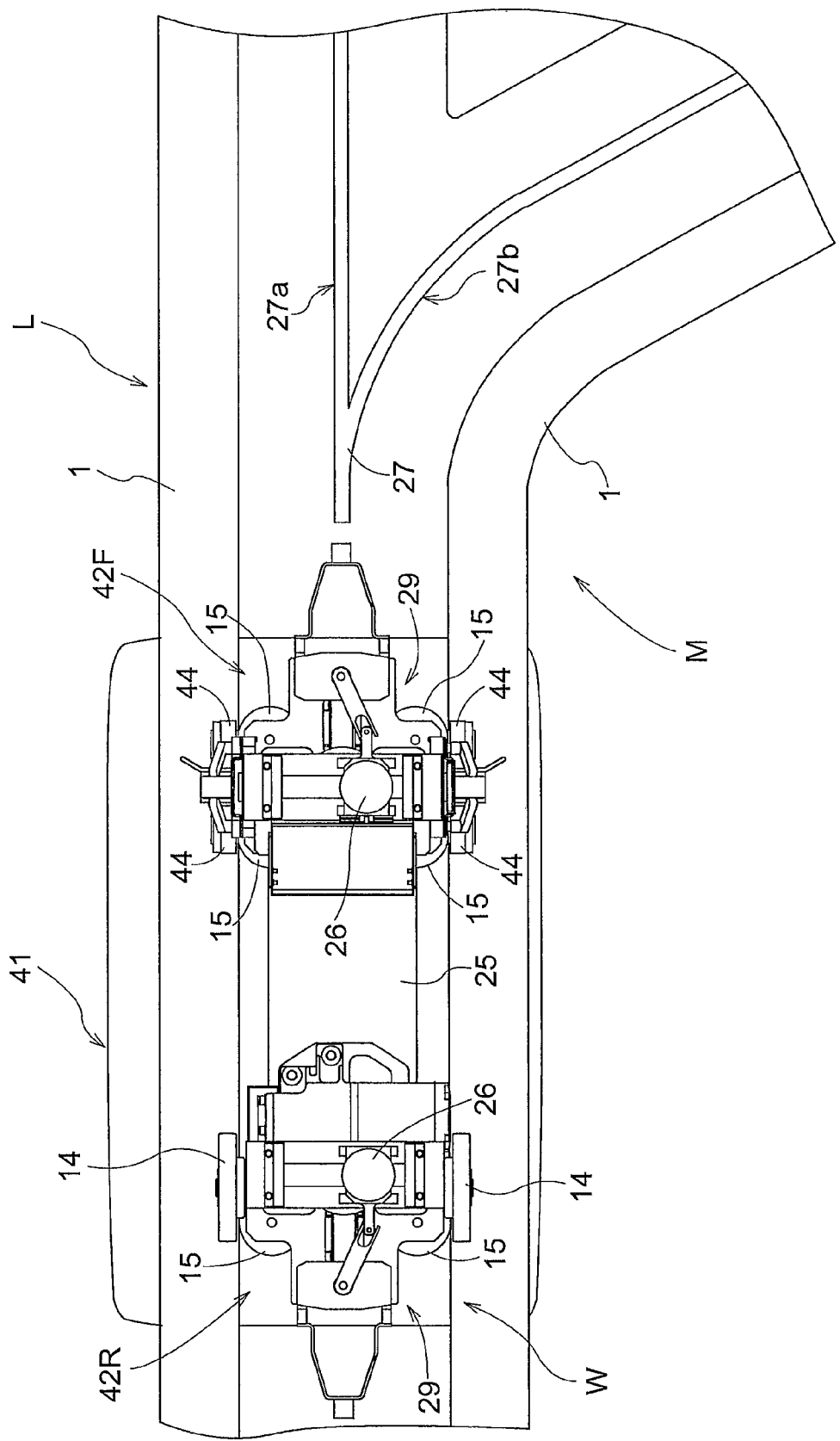
FIG. 7 is a plan view showing the state of the cleaning carriage in a diverging portion.

As shown in FIGS. 5-7, the cleaning carriage W includes a carriage main body portion 41 located below the travelling guide portion L, and a pair of front and back travel portions 42F, 42R that travel along the travelling guide portion L. And the carriage main body portion 41 mounts the vacuum cleaner G.

And a pair of front and back connecting shafts 43F, 43R that extend downwardly from the pair of front and back travel portions 42F, 42R are provided such that they extend downwardly through a space between the pair of right and left travel rails 1.

And the carriage main body portion 41 is suspended from and supported by the pair of front and back travel portions 42F, 42R by means of the connecting shafts 43F, 43R such that the main portion 41 can be rotated relative to the front and back travel portions 42F, 42R about the vertically extending axis of each of the pair of connecting shafts 43F, 43R.

Incidentally, in the present embodiment, the carriage main body portion 41 of the cleaning carriage 2F defines a suspended portion suspended from and supported by the pair of front and back travel portions 42F, 42R through the connecting shafts 43F, 43R. And the carriage main body portion 41 which defines the suspended portion defines a vacuum cleaner support for supporting the vacuum cleaner G.

In addition, in the following description, the lateral direction of the cleaning carriage W is referred to as the carriage lateral direction for short, the fore and aft direction of the cleaning carriage W is referred to as the carriage fore and aft direction for short, and the vertical width direction of the cleaning carriage W is referred to as the carriage vertical direction for short.

The configuration of the cleaning carriage W is described next in which the parts or members that are the same as the components of the transport carriage 2 will be described using the same reference numerals as those used for the components of the transport carriage 2 in order to clarify the relationship with the configuration of the transport carriage 2.

Incidentally, the back travel portion 42R of the pair of right and left travel portions 42F, 42R has the same specification and configuration as the back travel portion 10R of the pair of front and back travel portions 10F, 10R of the transport carriage 2. But the front travel portion 42F of the pair of right and left travel portions 42F, 42R has or mounts the plurality of cleaning suction portions K and the interrupting means E described above and thus has a different configuration from that of the front travel portion 10F of the pair of right and left travel portions 10F, 10R of the transport carriage 2.

Provided to each of the pair of front and back travel portions 42F 42R of the cleaning carriage W are guide wheels 15 which can be rotated about axes that extend along the carriage vertical direction and which are in contact with the inwardly facing side faces of the pair of right and left travel rails 1 similarly with each of the pair of front and back travel portions 10F, 10R of the transport carriage 2, as well as a guide wheel 26 whose position in the carriage lateral direction can be changed by the guide surface switching means 29.

Two pairs of right and left guide wheels 15 are provided to each of the pair of front and back travel portions 42F 42R with one pair spaced apart from the other in the carriage fore and aft direction.

And travel wheels 14 that are driven and rotated by an electric drive motor 13 are provided to the back travel portion 42R of the pair of right and left travel portions 42F, 42R such that they travel on the traveling surfaces formed on the top surfaces of the pair of right and left travel rails 1 similarly with each of the pair of front and back travel portions 10F, 10R of the transport carriage 2.

In addition, travel wheels 44 that can rotate freely are provided to the front travel portion 42F of the pair of right and left travel portions 42F, 42R such that they travel on the traveling surfaces formed on the top surfaces of the pair of right and left travel rails 1.

These travel wheels 44 are provided on either side of the front travel portion 42F in the carriage lateral direction such that one is located forwardly of the connecting shaft 43F while the other is located rearwardly of the connecting shaft 43F in a side view.

That is, a pair of right and left first travel wheels 44 are provided forwardly of the connecting shaft in a side view and another pair of right and left second travel wheels 44 are provided rearwardly of the connecting shaft.

Therefore, the cleaning carriage W is configured to travel along the travel rails 1 by virtue of the fact that the travel wheels 14 of the back travel portion 42R are driven and rotated with its position in the carriage lateral direction controlled or guided by virtue of the fact that the guide wheels 15 of the pair of front and back travel portions 42F, 42R are guided by the pair of travel rails 1.

In addition, the cleaning carriage W is configured to be able to travel well also in an arc-shaped path portion 5 in the predetermined travel paths by virtue of the fact that the pair of front and back travel portions 42F, 42R can flex or change directions with respect to the carriage main body 41 about vertically extending axes.

Furthermore, the cleaning carriage W is configured to be able to maintain its attitude even when the path portion exists in the travel path in the diverging portion M and the converging portion N, in which the travel rail 1 is located only on one side in the carriage lateral direction, by virtue of the fact that the guide wheels 26 are guided by the guide rail 27. And the cleaning carriage W is configured to be able to switch between the state in which the cleaning carriage W2 travels along the straight path portion 4, and the state in which the cleaning carriage W2 travels along the arc-shaped path portion 5 in the diverging portion M and the converging portion N by switching the position of the guide wheel 26 in the carriage lateral direction.

In addition, a single power receiving portion (power receiving coil) 25 to which driving electric power is supplied contactlessly or without contact from the right and left electricity supply lines 24 is provided in an upper portion of the carriage main body portion 41. Thus, the cleaning carriage W is configured to operate with the driving electric power that is supplied contactlessly.

More specifically, the cleaning carriage W includes an operation controller (not shown) that controls operation of the cleaning carriage W by controlling, among other things, the traveling operation of the back travel portion 42R and the operation of the guide surface switching means 29 of the pair of front and back travel portions 42F, 42R.

And the operation controller is configured to perform a cleaning operation which involves traveling from a start position to a destination position specified in a travel command when the operation controller receives the travel command which specifies the start position and the destination position from the facility management computer described above through wireless communications etc.

More specifically, the cleaning carriage W includes various sensors such as a sensor for detecting the current position on the predetermined travel path and a sensor for detecting the distance traveled by the cleaning carriage W from a reference point. And the operation controller is configured to control the traveling operation of the back travel portion 42R and the operation of the guide surface switching means 29 of the pair of front and back travel portions 42F, 42R based on the detected information from the various sensors in order to travel from the specified start position to the destination position.

Incidentally, when performing a cleaning process, a human operator gives the facility management computer the operation command which specifies the start position and the destination position.

In addition, an operator turns on the operating switch of the vacuum cleaner G to place the vacuum cleaner G in the operating state when performing a cleaning operation.

The carriage main body portion 41 supports the vacuum cleaner G as described above. More specifically, as shown in FIG. 5, the carriage main body portion 41 includes a casing 45 that opens downwardly and that surrounds the upper area and side areas; and an air discharge portion D that closes the lower opening of the casing 45.

And the vacuum cleaner G is located inside the holding space U that is compartmentalized (that is, surrounded from above, below, right, left, front, and back) by the casing 45 and the air discharge portion D such that the vacuum cleaner G discharges air into the holding space U.

The vacuum cleaner G is configured be operated by the mounted battery (not shown). And although not described in detail, a part of a side wall of the casing 45 is configured to be able to be opened and closed to replace the battery.

The air discharge portion D has fan filter units 46 that draw in air that is discharged from the vacuum cleaner G and discharge it downwardly. And more specifically, the air discharge portion D has a total of four fan filter units 46 with two fan filter units 46 arranged next to each other in both the vehicle body fore and aft direction and the vehicle body lateral direction such that they draw in air in the holding section that holds the vacuum cleaner G.

Incidentally, although not shown, an opening for introducing ambient air as air is discharged from the air discharge portion D is formed in an upper wall of the casing 45.

Each fan filter unit 46 has the cleaning filter 46A and a ventilating fan 46B, and is configured to draw air from the holding space and to discharge the air—that has been moved past the cleaning filter 46A—downwardly by the ventilation action of the ventilating fan 46B.

Incidentally, in the present embodiment, the fan filter units 46 are electrically connected to the power receiving portion (power receiving coil) 25 described above, and are configured to be operated by the electric power supplied to the power receiving portion 25.

The first cleaning portion K1 to the third cleaning portion K3 as the plurality of cleaning suction portions K, interrupting means E, and the front travel portion 42F which mount these portions are described next in detail.

Figure 8:
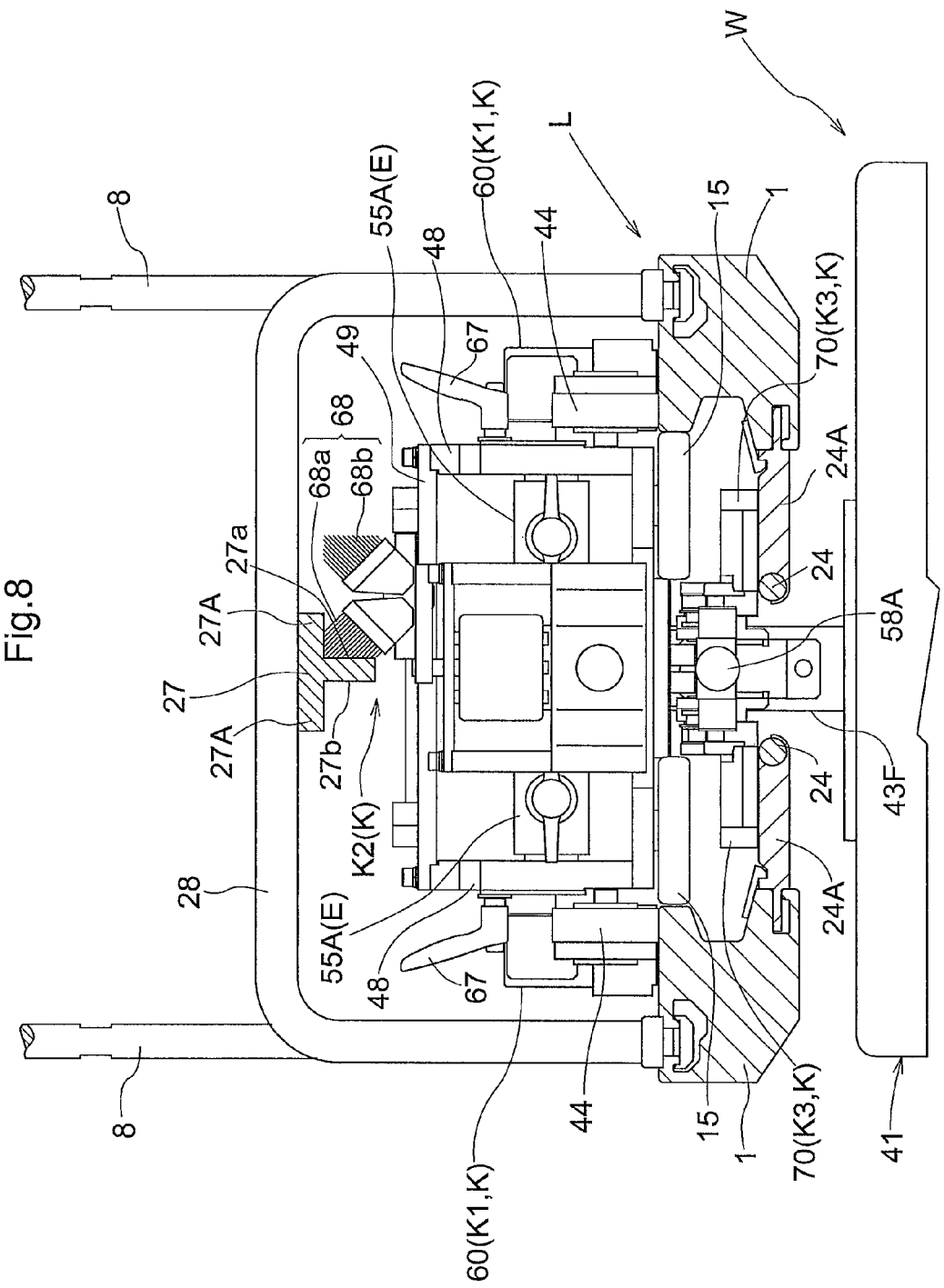
FIG. 8 is a front view of a front travel portion of the cleaning carriage.
Figure 9:
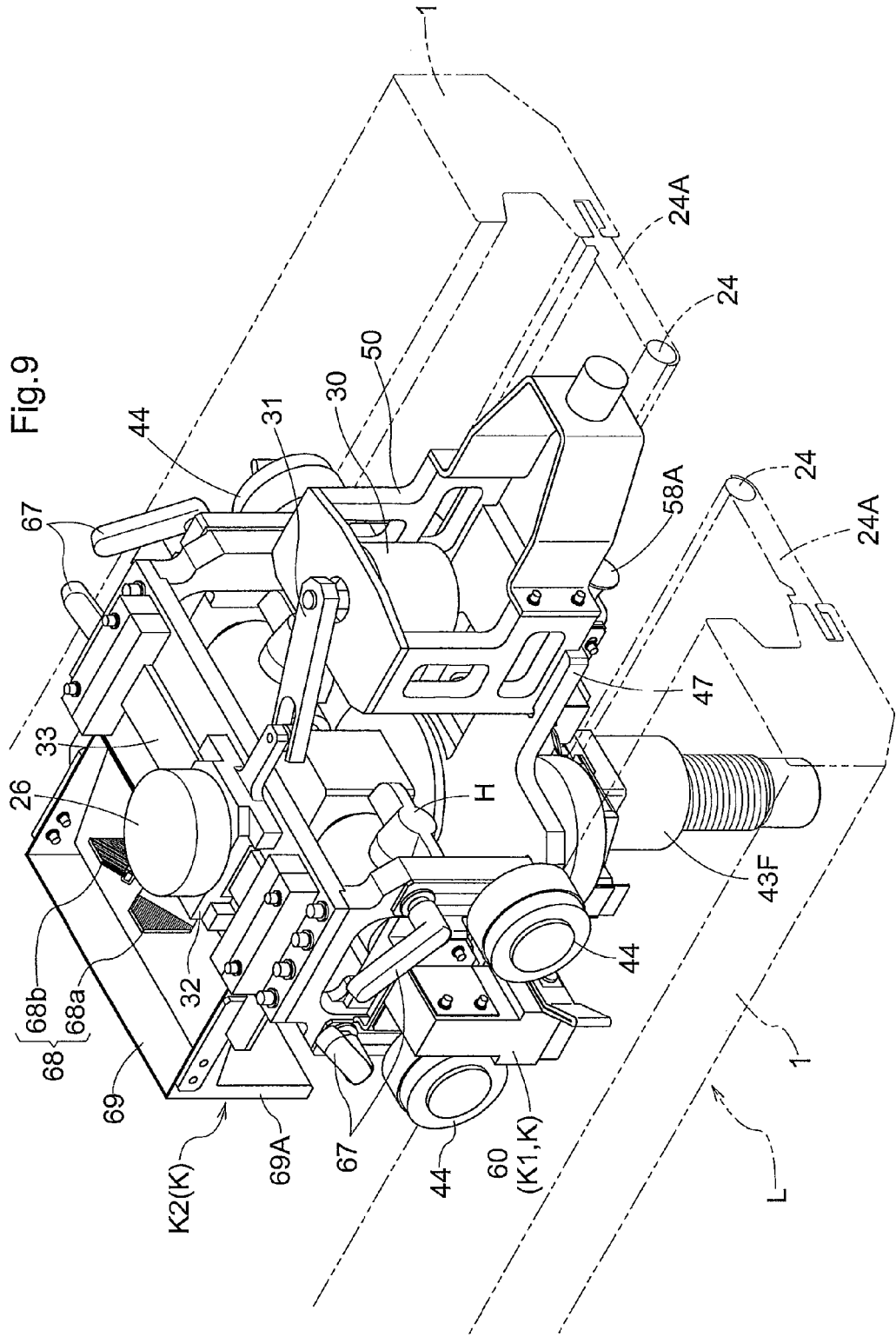
FIG. 9 is a perspective view of the portion shown in FIG. 8.
Figure 10:
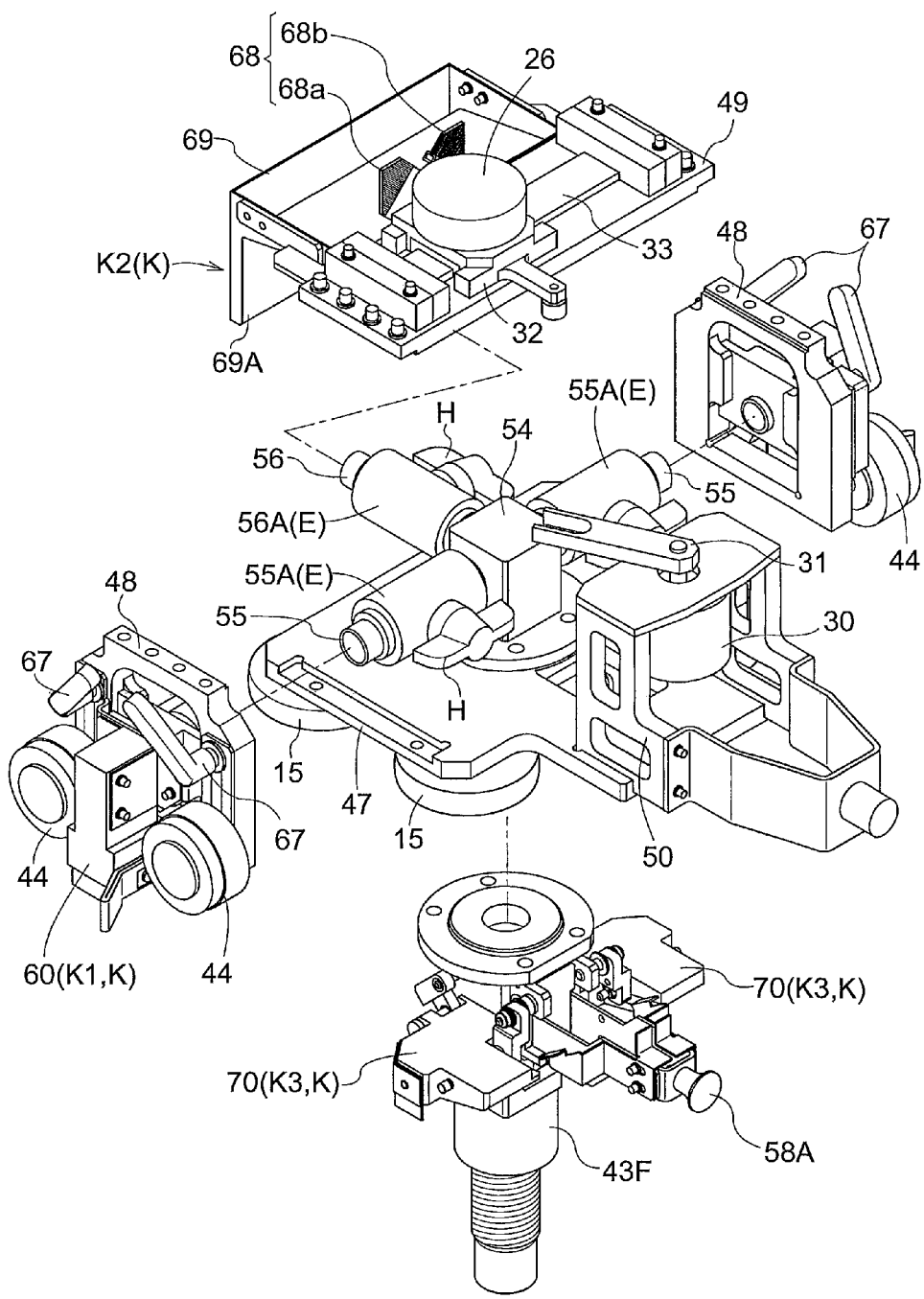
FIG. 10 is an exploded perspective view of the same portion shown in FIGS. 8 and 9.

That is, as shown in FIGS. 8-10, the front travel portion 42F includes a horizontally oriented plate-shaped lower frame 47, a pair of right and left side frames 48 which are connected by bolts to, and which stand erect on, the right and left end portions of the lower frame 47, and an upper frame 49 which is connected to the upper portions of the right and left side frames 48 and which connects the right and left side frames 48 to each other.

The guide wheels 15 are provided or mounted to the lower frame 47. The pair of front and back travel wheels 44 are mounted to each of the right and left side frames 48. The travel guide portion 33 which defines a part of the guide surface switching means 29 is mounted to the upper frame 49. And the guide wheel 26 is mounted to the movable body 32 that is guided by the travel guide portion 33.

In addition, a support frame 50 having an inverted "U" shape (i.e., bracket shape that opens downwardly) is mounted on an forward end portion of the lower frame 47.

The actuator 30 and the pivot arm 31 which define a part of the guide surface switching means 29 are provided to or mounted on this support frame 50.

Figure 11:
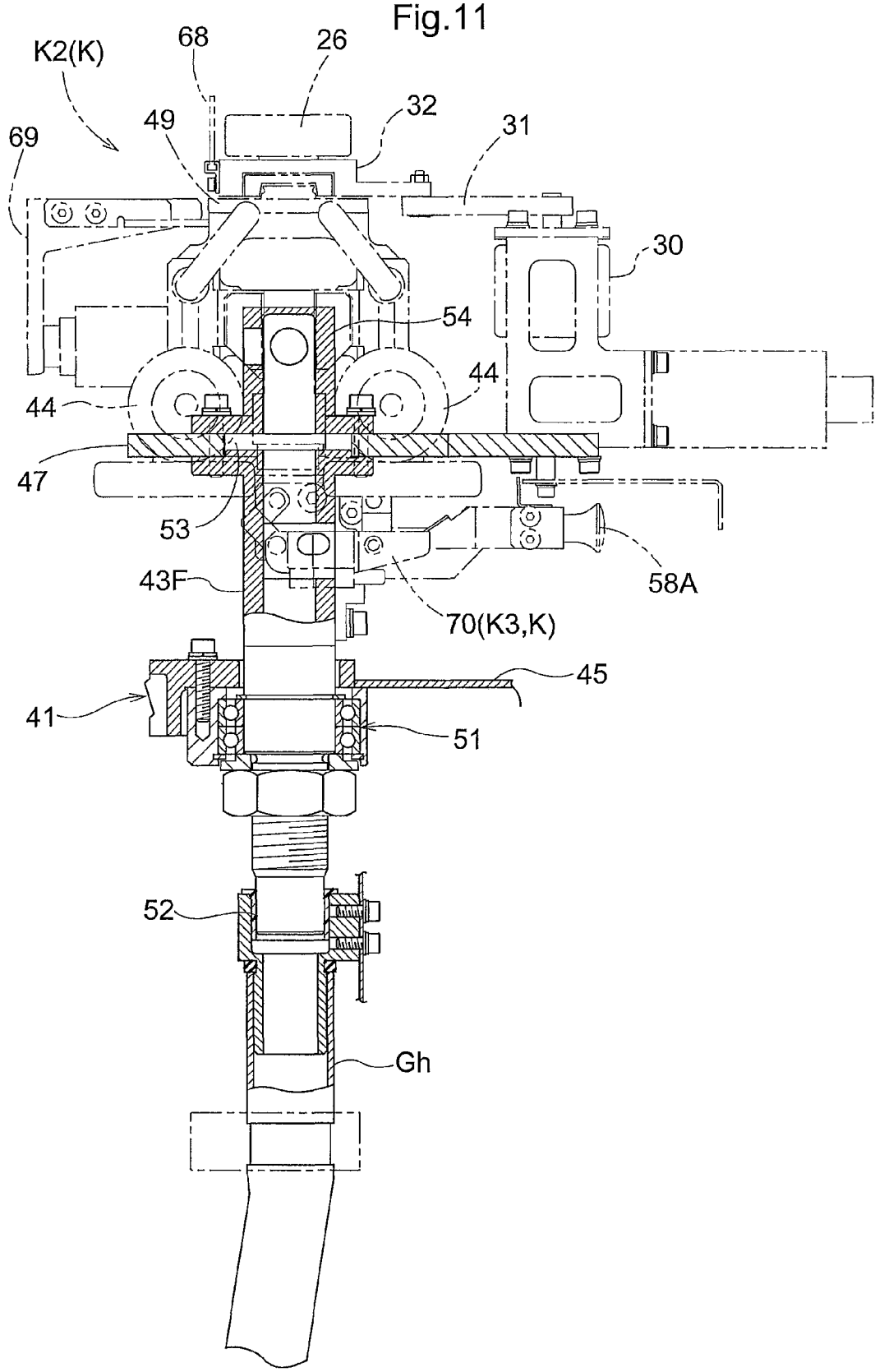
FIG. 11 is a vertical sectional side view of a fitting portion of a front connecting shaft

As shown in FIG. 11, the upper end portion of the front connecting shaft 43F is connected by bolts to the undersurface of the lower frame 10. And the casing 45 of the carriage main body portion 41 is rotatably attached to a vertically intermediate portion of the connecting shaft 43F by means of a bearing 51.

That is, the front connecting shaft 43 is fixedly provided to the front travel portion 42F. And the casing 45 of the carriage main body portion 41 is attached to the front connecting shaft 43F such that the main body portion 41 can rotate about the axis of the connecting shaft 43F.

The front connecting shaft 43F is formed as a tube to define a part of channel or conduit for communicating the vacuum cleaner G with the plurality of cleaning suction portions K. And a flexible (or elastic) suction hose Gh that extends from the vacuum cleaner G is connected to the lower end portion of the connecting shaft 43F.

The upper end portion of the suction hose Gh is fixed to and supported by the casing 45 of the carriage main body portion 41, and is mounted and fit onto the connecting shaft 43F through and by means of a bearing tubular member 52 which can rotate with respect to the connecting shaft 43F so that the suction hose Gh can be rotated relative to the connecting shaft 43F when the front travel portion 42F is rotated about the axis of the connecting shaft 43F with respect to the carriage main body portion 41.

A communicating hole 53 for forming a channel is formed in the attachment portion in the lower frame 10 for attaching the connecting shaft 43F. And a tubular member 54 whose the upper end is closed is connected by bolts to the upper side of the lower frame 10 such that the internal space of the tubular member 54 communicates with the communicating hole 53.

Connected to the tubular member 54 are a pair of right and left first channel forming members 55 (see FIGS. 10 and 16) for the first cleaning portion K1 for the traveling surfaces of the pair of right and left travel rails 1 and the second channel forming member 56 (see FIGS. 10 and 13) for the second cleaning portion K2 for the first guide surface 27a and the second guide surface 27b of the guide rail 27.

Each of the pair of first channel forming members 55 includes an opening and closing valve 55A that can be opened and closed by a rotating handle H. And the first cleaning portions K1 are configured to be switched between a suctioning state and non-functioning state by opening and closing this opening and closing valve 55A.

In addition, the second channel forming member 56 includes an opening and closing valve 56A that can be opened and closed by a rotating handle H. And the second cleaning portion K2 is configured to be switched between a suctioning state and non-functioning state by opening and closing this opening and closing valve 56A.

The rotating handles H of the opening and closing valves 55A and the opening and closing valve 56A are configured to be operated by a human hand, and are located in positions that can be accessed and operated by hand.

However, these rotating handles H may be configured to be rotated by conventional means such as actuators such as a motor to which electric power is supplied and which is electrically connected to an operation controller.

Figure 18:
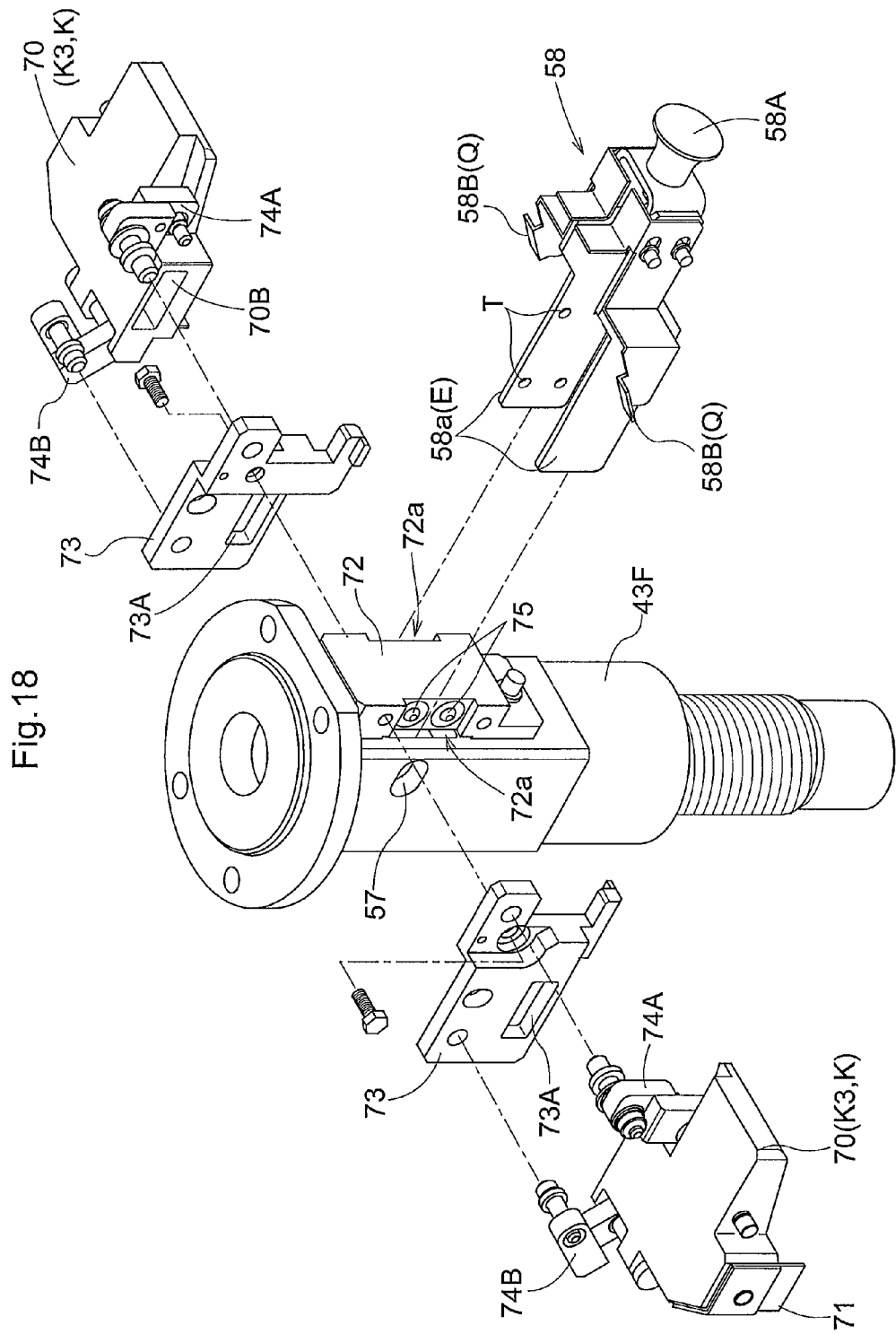
FIG. 18 is an exploded perspective view of a fitting portion of the third cleaning portion.
Figure 20:
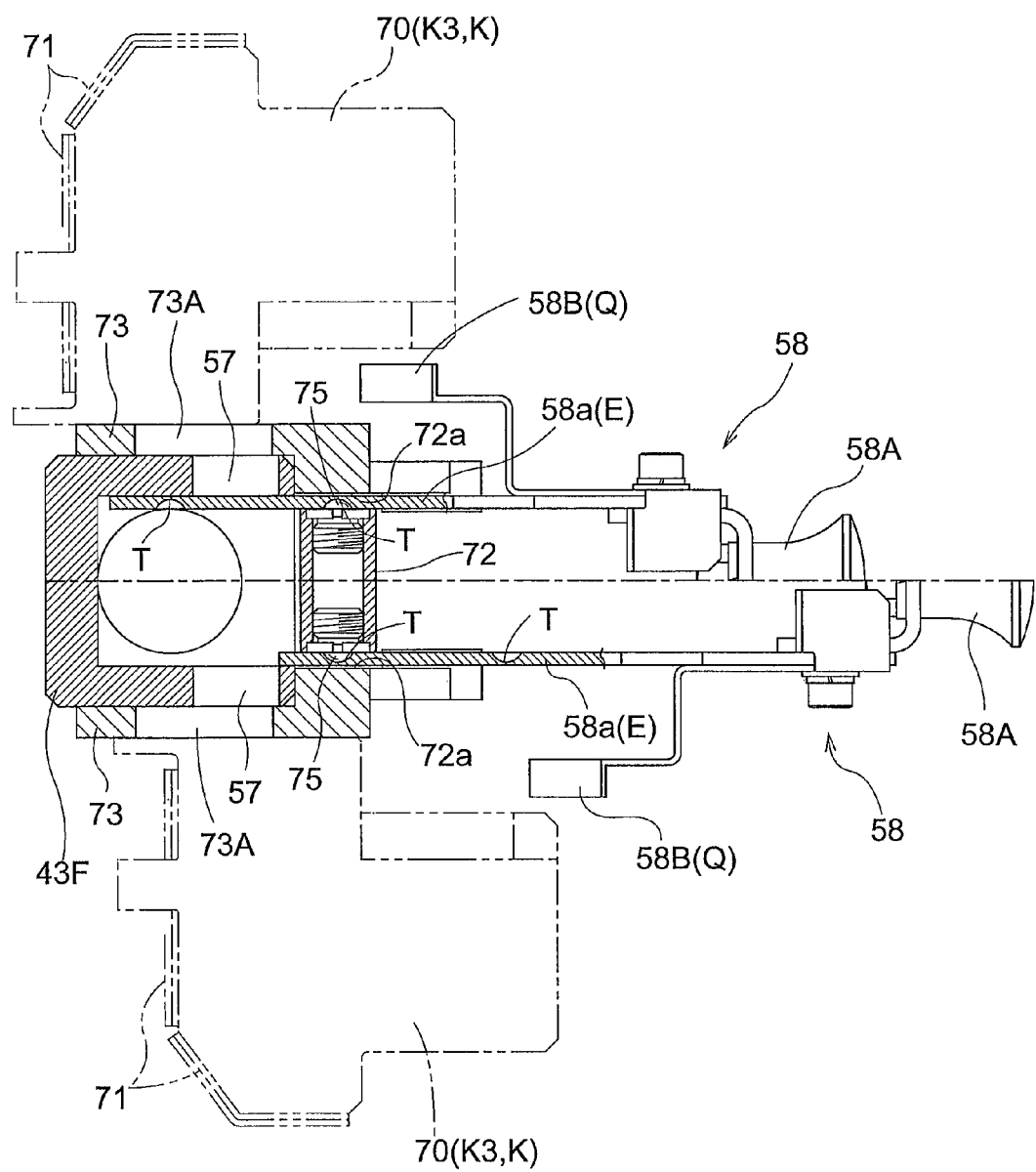
FIG. 20 is a partially cut-out plan view of the portion shown in FIGS. 18 and 19, FIGS. 21A and 21B are partially cut-out side views of the portion shown in FIGS. 18, 19, and 20, and FIGS. 22A, 22B, and 22C are side views showing the state of the third cleaning portion during cleaning action.

As shown in FIGS. 18 and 20, formed near the upper end of the front connecting shaft 43F are a pair of right and left communicating holes 57 for and corresponding to the third cleaning portions K3 for the top surfaces of the pair of holding portions 24A that hold the pair of right and left electricity supply lines 24. And a pair of right and left slide plates 58a for opening and closing these communicating holes 57 are provided such that they extend rearwardly from an opening and closing frame 58.

The opening and closing frame 58 includes an operation grip portion 58A that is configured to be operated by human hand and located at a position that can be operated by hand.

However, the operation grip portion 58A may be configured to be moved linearly by conventional means such as actuators such as a motor to which electric power is supplied and which is electrically connected to an operation controller.

And the pair of right and left third cleaning portions K3 are configured to be able to be switched between a suctioning state and a non-functioning state by opening and closing the communicating holes 57 with the pair right and left slide plates 58a.

Therefore, in the present embodiment, the interrupting means E described above includes the opening and closing valve 55A provided to the first channel forming member 55, the opening and closing valve 56A provided to the second channel forming member 56, and the pair of right and left slide plates 58a.

Figure 14:
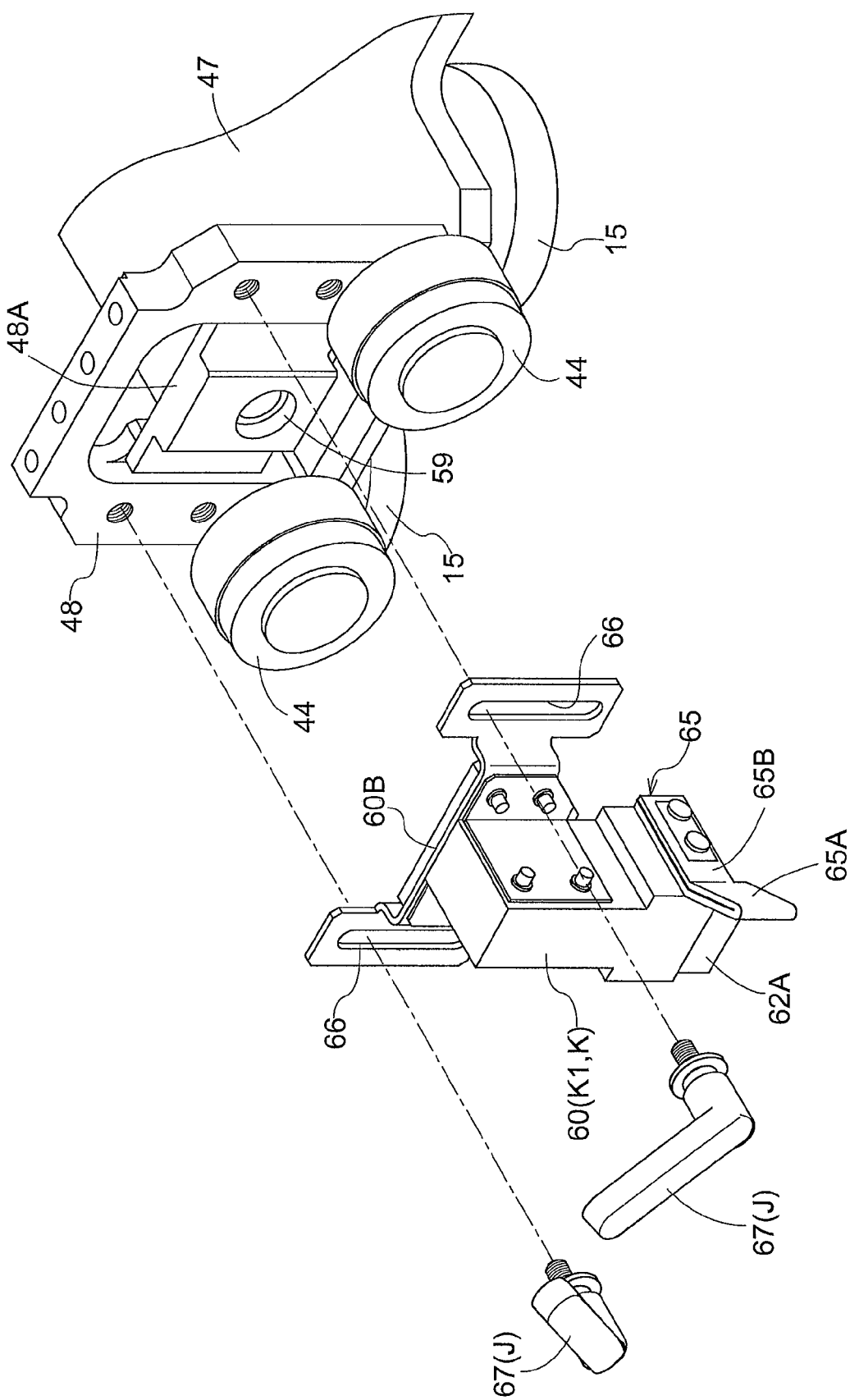
FIG. 14 is an exploded perspective view of a fitting portion of the first cleaning portion.
Figure 15:
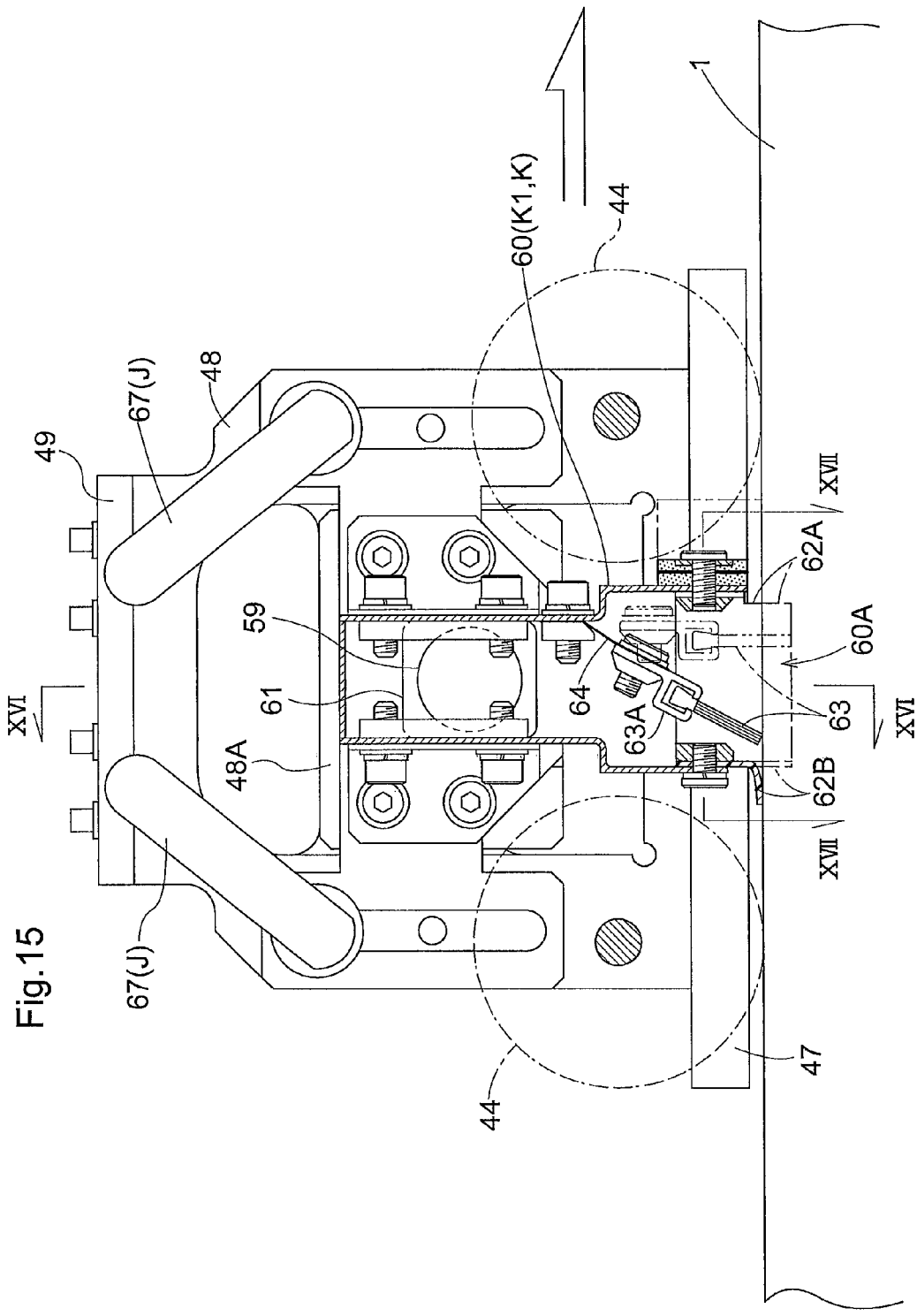
FIG. 15 is a partially cut-out side view of the portion shown in FIG. 14.
Figure 16:
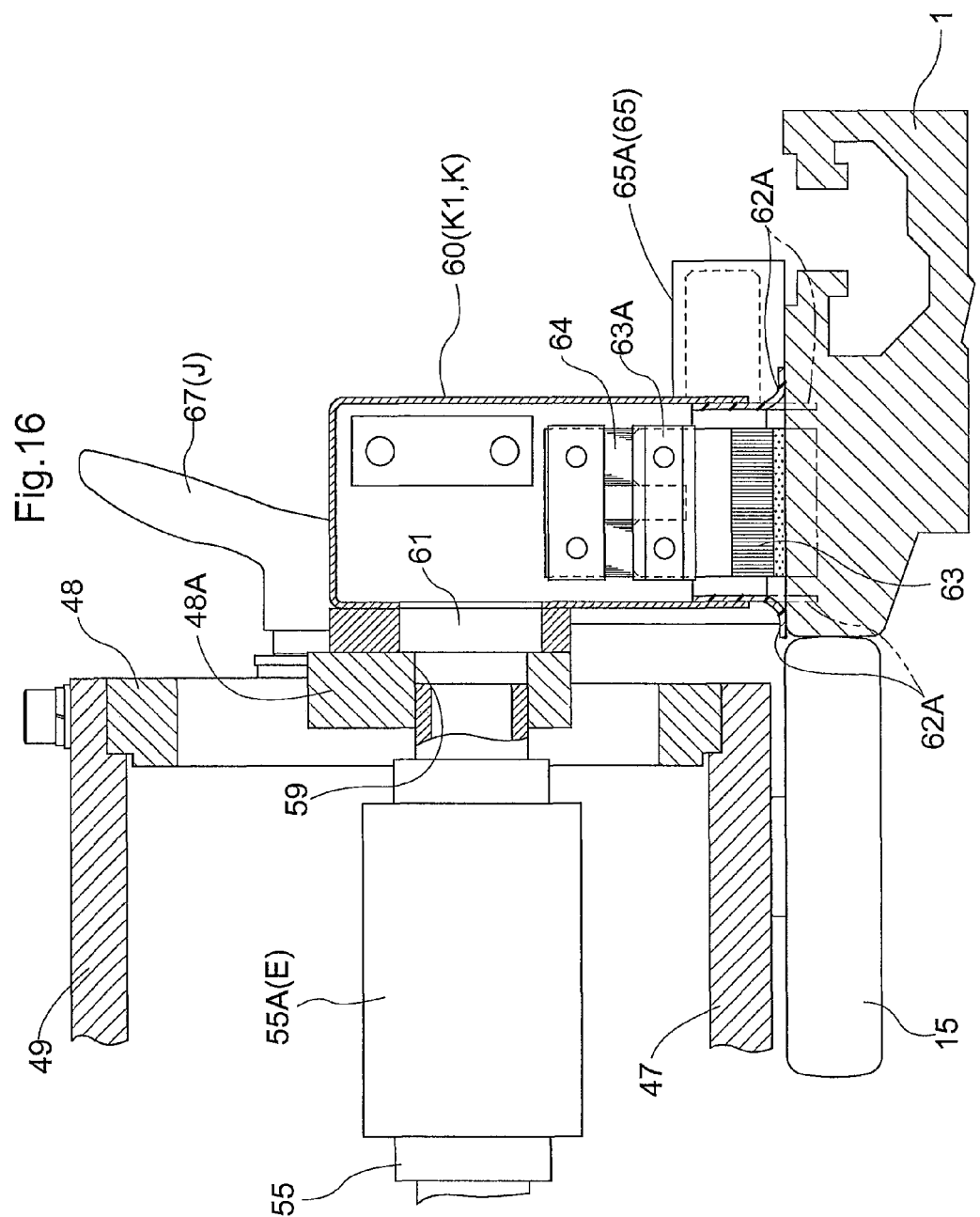
FIG. 16 is a view as seen from XVI-XVI in FIG. 15.

As shown in FIGS. 14-16, a channel forming plate 48A having a connection hole 59 is connected by bolts to each side frame 48. And an end of the first channel forming member 55 is fit into the connection hole 59 of this channel forming plate 48A.

And a tubular member 60 which has a closed top and a suction opening 60A that faces the traveling surface of the travel rail 1 in its lower portion is sealingly attached to the channel forming plate 48A. And a communicating hole 61 for communicating with the connection hole 59 is formed in the tubular member 60 at a location that faces the channel forming plate 48A. Thus, the tubular member 60 is configured to perform suctioning action on the traveling surface of the travel rail 1 by the suction power of the vacuum cleaner G when the opening and closing valve 55A provided to the first channel forming member 55 is open.

More specifically, the tubular member 60 defines the first cleaning portion K1 and is located between the pair of front and back travel wheels 44 described above in a side view (that is, between the pair of right and left first travel wheels 44 located forwardly of the connecting shaft 43F and the pair of right and left second travel wheels 44 located rearwardly of the connecting shaft 43F).

As shown in FIGS. 14-17, a pair of right and left first sliding contact members 62A which are formed with elastically deformable material (e.g., synthetic rubber) are connected by bolts to a front wall portion and to the inner surfaces of the right and left side wall portions that define the suction opening 60A of the tubular member 60. And a second sliding contact member 62B which is formed with elastically deformable material (e.g., synthetic rubber) is connected by bolts to the inner surface of the back wall portion that defines the suction opening 60A of the tubular member 60.

The portions—of the first sliding contact members 62A— that correspond to the right and left side wall portions of the tubular member 60 and the second sliding contact member 62B project downwardly to a large extent from the tubular member 60 such that they are in sliding contact with the traveling surface of the travel rail 1.

And the portions—of the first sliding contact members 62A—that correspond to the front wall portion of the tubular member 60 project below the tubular member 60 but do not contact the traveling surface of the travel rail 1.

Thus, each of the first cleaning portions K1 is configured to suction any dust adhered to and accumulated on the traveling surface of the travel rail 1 as the tubular member 60 is moved along the travel rail 1 with the first sliding contact members 62A and the second sliding contact member 62B in contact with the traveling surface of the travel rail 1.

In addition, as shown in FIGS. 15 and 16, a dust removing brush 63 which is in sliding contact with the traveling surface of the travel rail 1 is provided within the tubular member 60.

This dust removing brush 63 has a support frame 63A in its upper end that is supported by a leaf spring 64 connected by bolts to the inner surface portion of the tubular member 60.

And as shown with solid lines in FIG. 15, the dust removing brush 63 is configured to be pressed against, i.e., to be urged toward, the traveling surface by the elastic force of the leaf spring 64 when in contact with the traveling surface of the travel rail 1.

Therefore, each first cleaning portion K1 is configured to scrape off or brush off any dust adhered to and accumulated on the traveling surface of the travel rail 1 with the dust removing brush 63 and to have any dust scraped off or brushed off drawn in or suctioned by the tubular member 60 as the cleaning carriage W travels.

Figure 17:
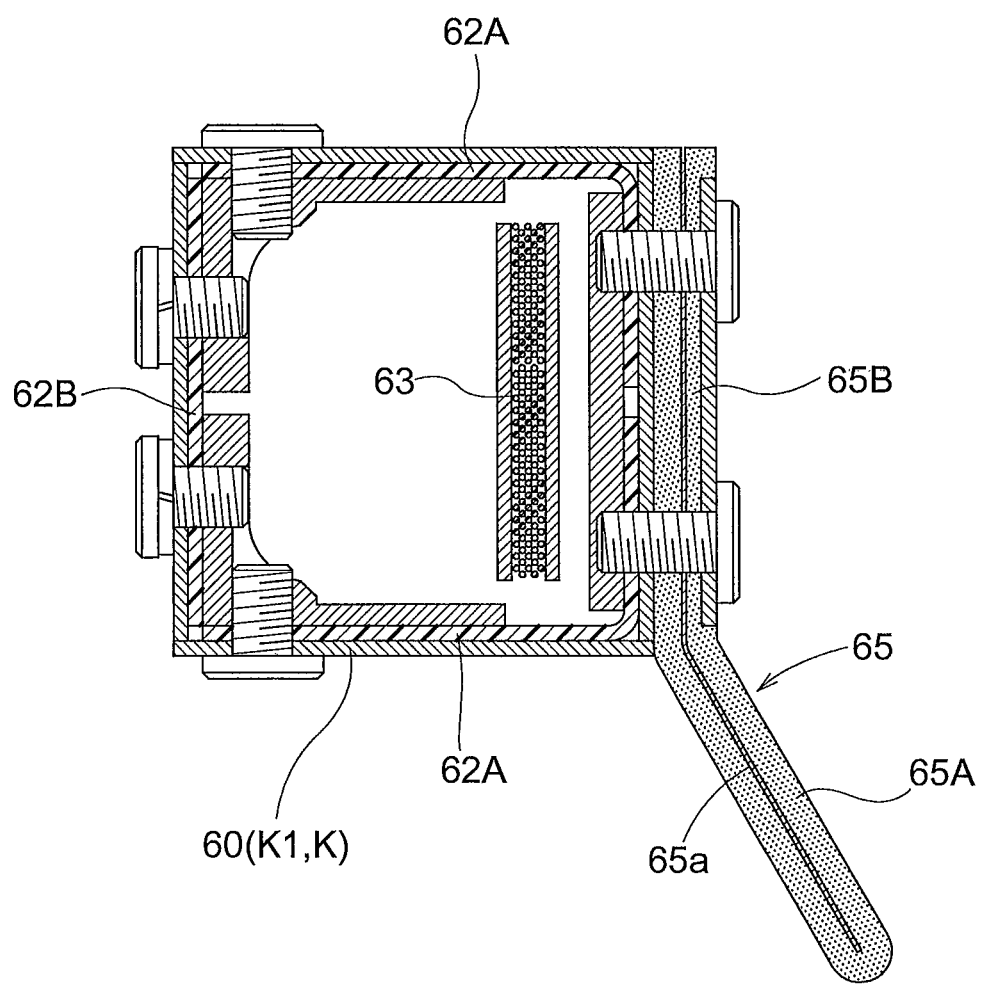
FIG. 17 is a view as seen from XVII-XVII in FIG. 15.

In addition, as shown in FIGS. 14 and 17, nonwoven fabric 65 is provided to the front portion of the tubular member 60 such that the fabric 65 projects laterally outwardly of the tubular member 60.

This nonwoven fabric 65 is configured such that its projecting portion 65A which projects laterally outwardly of the tubular member 60 has an inclined attitude in which the projecting portion 65A is located further forward toward its outer end by means of a core member 65a made of a leaf spring provided within, and such that the projecting portion 65A is in contact with the traveling surface of the travel rail 1 and its main body portion 65B located on the front side of the tubular member 60 is located above the traveling surface of the travel rail 1 (see FIG. 15).

Thus, the first cleaning portion K1 is configured to guide any dust—that exists in the portion of the traveling surface of the travel rail 1 that is laterally outward of the tubular member 60—toward the tubular member 60 with the inclined portion of the nonwoven fabric 65 as the cleaning carriage W travels, and to have the dust thus guided and moved drawn in or suctioned by the tubular member 60.

Further, as shown in FIGS. 14 and 15, the tubular member 60, as the first cleaning portion K1, is configured to be vertically moved or raised and lowered between a suction position in which the first sliding contact members 62A and the second sliding contact member 62B are in contact with the traveling surface of the travel rail 1 and a retracted position at which the members 62A and 62B are retracted upwardly from the traveling surface, and is configured to be held in place by holding means J in the retracted position.

That is, a plate-shaped support frame 60B for attaching the tubular member 60 to the side frame 48 is provided at the portion of the tubular member 60 that faces the side frame 48 such that the support frame 60B protrudes more forwardly and rearwardly than the tubular member 60.

And a connection hole 66 that is long along the vertical direction is formed n each of the front protruding portion and the back protruding portion of the support frame 60B.

And a pair of bolts 67, each having a handle, for fastening and fixing the support frame 60B to the side frame 48 are inserted through the connection holes 66s to be meshed into the respective side frames 48.

Thus, the tubular member 60A can be raised and lowered between the suction position and the retracted position with the pair of bolts 67 each having a handle loosened. Also, the tubular member 60 can be held in a retracted position by tightening the pair of bolts 67 having handles when the tubular member 60 is located at the retracted position, and can be held in the suction position by tightening the pair of bolts 67 having handles when the tubular member 60 is located at the suction position.

FIG. 15 shows, with dotted lines, the tubular member 60 in the suction position where the dust removing brush 63, the first sliding contact members 62A, and the second sliding contact member 62B are not in contact with the traveling surface.

Incidentally, in the present embodiment, the holding means J for holding the tubular member 60 as the first cleaning portion K1 in the retracted position is defined by the pair of bolts 67 with handles.

Instead of tightening the pair of bolts 67 having handles when the tubular member 60 is located at the suction position, the pair of bolts 67 having handles may be kept loosened so that the tubular member 60 can raise and lower to follow the traveling surface of the travel rail 1.

As shown in FIGS. 9 and 10, the second cleaning portion K2 for the first guide surface 27a and the second guide surface 27b of the guide rail 27 includes dust removing brushes 68 which are in sliding contact with the first guide surface 27a and the second guide surface 27b, and a suctioning dish-shaped member 69 that opens upwardly and that is located rearwardly of or behind the dust removing brushes 68.

Figure 12:
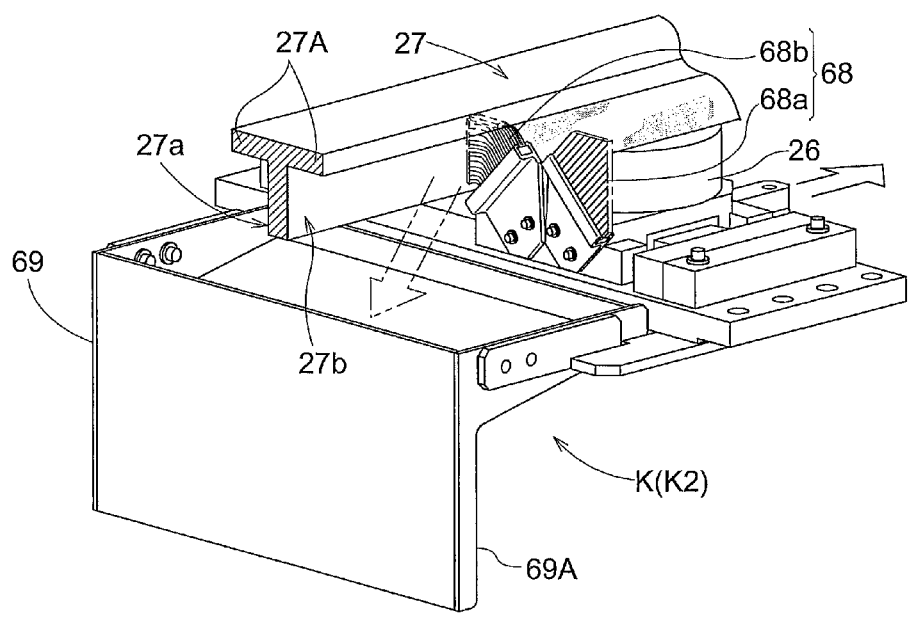
FIG. 12 is a perspective view of the second cleaning portion.
Figure 13:
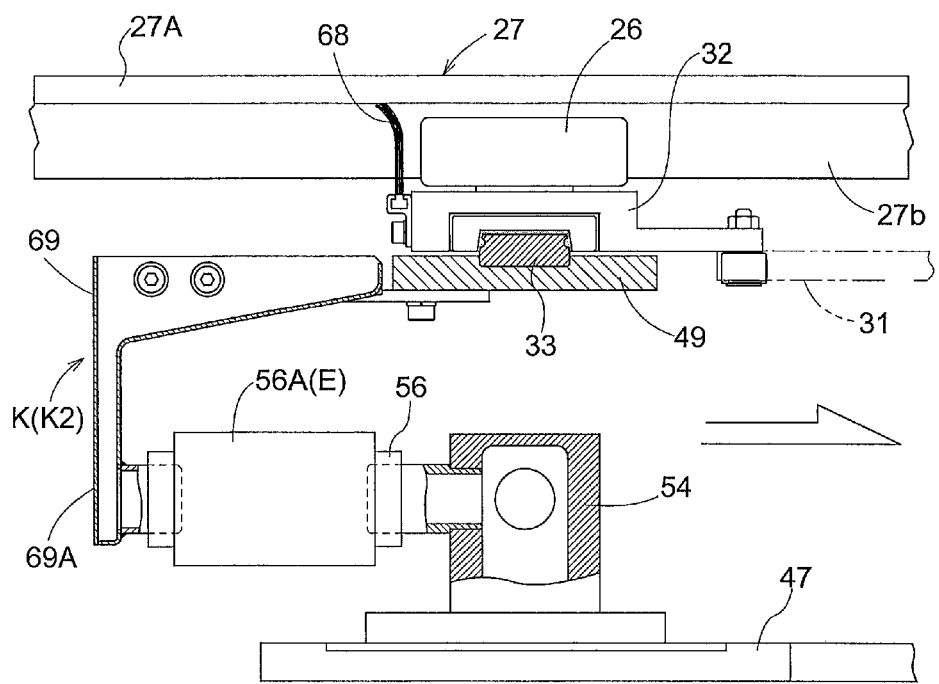
FIG. 13 is a partially cut-out side view of the portion shown in FIG. 12.

As shown in FIGS. 12 and 13, the bust removing brushes 68 are supported by the movable body 32 by which the guide wheel 26 is supported, and include a first brush 68a that contacts the first guide surface 27a when the guide wheel 26 is guided by the first guide surface 27a and a second brush 68b that contacts the second guide surface 27b when the guide wheel 26 is guided by the second guide surface 27b.

Incidentally, because the plurality of secondary travel paths 6a of the travelling guide portion L are cleaned using the cleaning carriage W and the primary travel path 6b is not cleaned in the present embodiment, and because each secondary travel path 6a shown in FIG. 1 as an example, is a simple loop, the guide wheel 26 is kept being guided by the second guide surface 27b when traveling in the secondary travel path 6a. Thus, the second guide surface 27b of the guide rail 27 is scraped or brushed by the second brush 68b.

When a secondary travel path 6a is configured to have, for example, two looped portions that are connected each other so that the guide wheel 26 is switched between a state in which it is guided by the first guide surface 27a and a state in which it is guided by the second guide surface 27b, then the first guide surface 27a is scraped or brushed by the first brush 68a whereas the second guide surface 27b is scraped or brushed by the second brush 68b.

In addition, as shown in FIGS. 12 and 13, the first brush 68a and the second brush 68b of the dust removing brushes 68 are configured to be in slide contact with the undersurfaces of the overhang portions 27A of the guide rail 27 to scrape off and brush off any dust on the undersurfaces of the overhang portions 27A which are continuous with the upper end of the first guide surface 27a and the second guide surface 27b.

As shown in FIGS. 10 and 13, the suctioning dish-shaped member 69 has, at its back end portion, a bulging portion 69A which bulges downwardly and to which the second channel forming member 56 is connected.

Therefore, the second cleaning portion K2 is configured to scrape or brush off any dust adhered to and accumulated on the first and second guide surfaces 27a, 27b of the guide rail 27, and the undersurfaces of the overhang portions 27A with the dust removing brush 68 as the cleaning carriage W travels and to suction the dust, that is scraped off or brushed off, through the suctioning dish-shaped member 69.

Each of the pair of right and left third cleaning portions K3 includes a suction member 70 defining a suction opening 70A that performs suctioning action on the top surface of the corresponding holding portion 24A for holding the electricity supply line 24.

The right and left suction members 70 as the pair of right and left third cleaning portions K3 are configured to be switched between a suctioning state and a non-functioning state by opening and closing the right and left communicating holes 57 in the connecting shaft 43F with the pair of right and left slide plates 58a as described above, are configured to be raised and lowered between a suction action position at which the suction members 90 are in contact with the top surfaces of the holding portions 24A and a retracted position at which the suction members 90 are retracted upwardly from the top surfaces of the holding portions 24A, and are configured to be held at the retracted position by holding means Q.

Figure 21A:
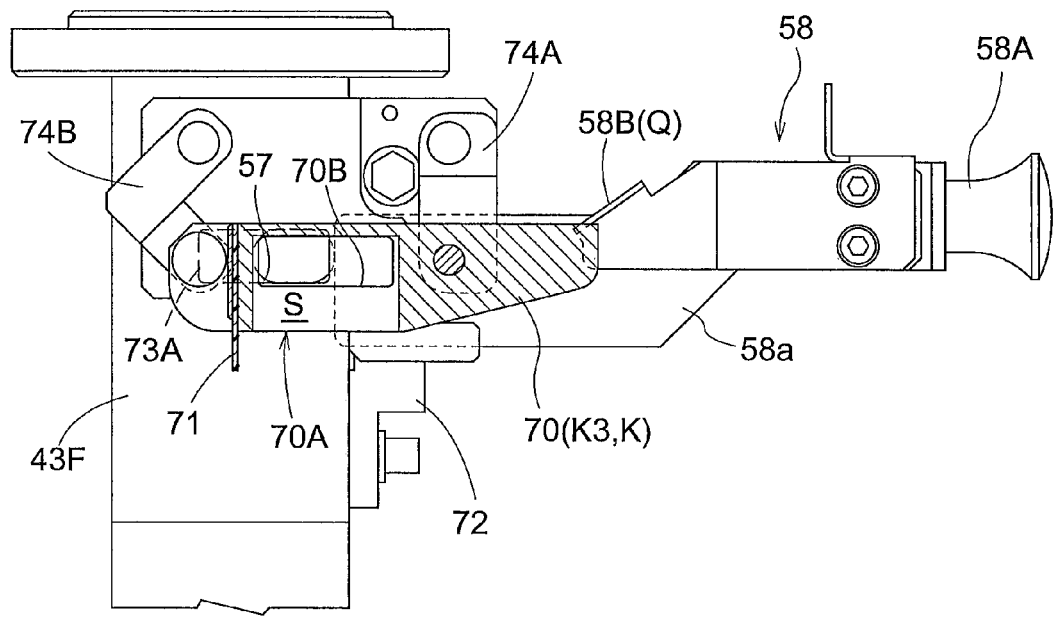
Figure 21B:
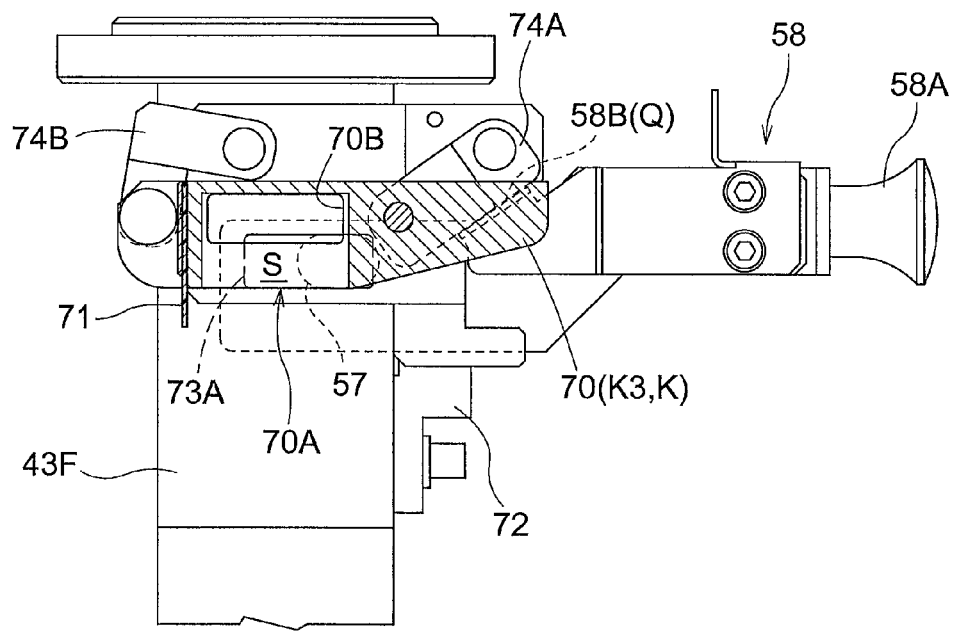

That is, as shown in FIGS. 18, 21A and 21B, each suction member 70 is formed to have a shape of a boat (i.e., the lower edge of its front portion is sloped upwardly toward the front and the lower edge of the back portion which is rearward of the front portion extends horizontally) in a side view, and has a suctioning space S which opens downwardly in the back end. And the lower opening of the suctioning space S is configured to function as the suction opening 70A described above. And a connection hole 70B is formed in a side surface located inwardly of the suctioning space S.

In addition, a sliding contact member 71 which is in contact with the top surface of the holding portion 24A is provided to each suction member 70 such that the sliding contact member 71 covers the rear and the lateral outer side of the suction opening 70A and protrudes downwardly.

This sliding contact member 71 is formed with elastically deformable material (for example, synthetic rubber).

A support frame 72 for the pair of right and left slide plates 58a is connected by bolts to the front of the upper end portion of the connecting shaft 43F. And a pair of right and left link frames 73 are connected by bolts to the support frame 72.

And each suction member 70 is supported by front and back links 74A, 74B such that the suction member can be raised and lowered with respect to the link frame 73 while maintaining its horizontal posture and its sealing contact with the link frame 73.

As shown in FIG. 22A-22C, upwardly projecting portions exist on the top surfaces of the holding portions 24A due to members for connecting ends of the electricity supply lines 24. However, the top surfaces of the holding portions 24A can be appropriately cleaned even where upwardly projecting portions exist on the top surfaces of the holding portions 24A since the suction members 70 can move vertically.

A link hole 73A is formed in each link frame 73 for communicating the communicating hole 57 in the connecting shaft 43F and the connection hole 70B in the suction member 70 with each other so that the suction force from the communicating hole 57 acts on or transmitted to the suctioning space S of the suction member 70.

As shown in FIG. 18, recessed portions 72a for inserting the pair of right and left slide plates 58a are formed in both side portions of the support frame 72.

Figure 19:
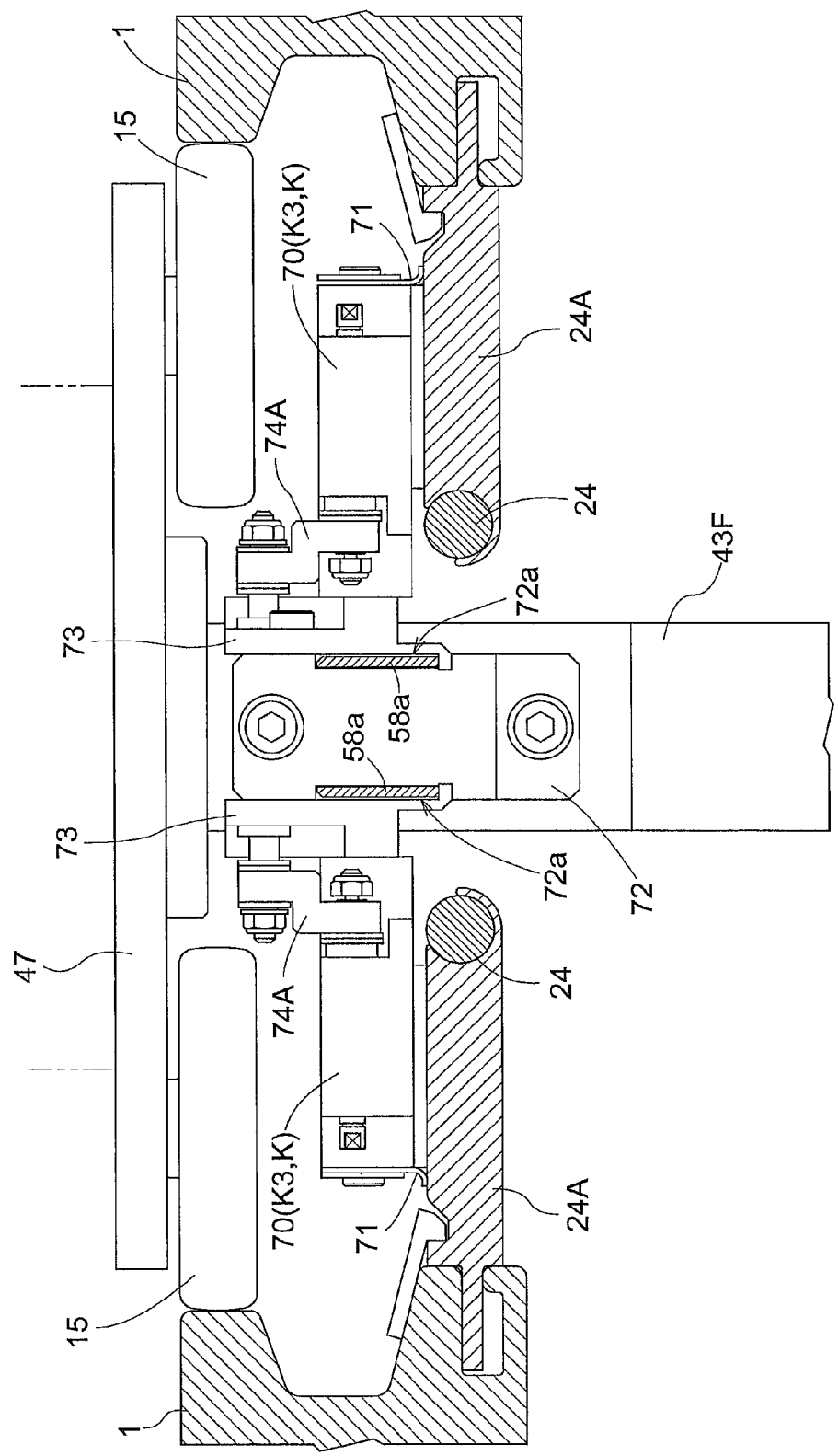
FIG. 19 is a front view of the portion shown in FIG. 18.

And as shown in FIGS. 19 and 20, the pair of right and left slide plates 58a are configured to be inserted into the recessed portions 72a of the support frame 72 and to slide while each slide plate 58a is sandwiched between the support frame 72 and the right or left link frame 73A.

As shown in FIGS. 21A and 21B, provided to the opening and closing frame 58 are pressure applying portions 58B that upwardly push and pivot the front link 74A (of the front and back links 74A, 74B described above) when the opening and closing frame 58 having the pair of right and left slide plates 58a is operated toward the back to close the communicating holes 57 with the slide plates 58a. And the suction members 70 can be held at the retracted position by upwardly pushing and thus pivoting the front links 74A with the pressure applying portions 58B of the opening and closing frame 58.

Therefore, in the present embodiment, the pressure applying portions 58B of the opening and closing frame 58 define the holding means Q for holding the suction member 70 at the retracted position.

In addition, as shown in FIG. 20, provided in the support frame 72 are positioning balls 75 that fit into recessed portions T formed in the inward surfaces of the slide plates 58a when the slide plates 58a are located at the position at which the plates 58a close the communicating holes 57 and when the slide plates 58a are located at the position at which the plates 58a open the communicating holes 57 so that the opening and closing frame 58 can be positioned or registered at the position for closing the communicating holes 57 and at the position for opening the communicating holes 57.

These positioning balls 75 are urged toward respective recessed portion T (i.e., outward direction) by springs.

The cleaning carriage W is configured in the manner described above. And the cleaning method using the cleaning carriage W is described next.

First, travel of the transport carriages 2 is controlled so that there is no transport carriage 2 in the secondary travel path 6a to be cleaned, among the plurality of secondary travel paths 6a.

Next, the cleaning carriage W is loaded onto the secondary travel path 6a to be cleaned.

Since each of the first cleaning portion K1 to the third cleaning portion K3 is a functioning unit in the present embodiment, the interrupting means E is used to switched to a state in which one of the first cleaning portion K1, second cleaning portion K2, and the third cleaning portion K3 is in communication with the vacuum cleaner G.

And by causing the cleaning carriage W to travel with the vacuum cleaner G turned on, the travelling guide portion L is cleaned by the cleaning portion that is in communication with the vacuum cleaner G among the first cleaning portion K1, the second cleaning portion K2, and the third cleaning portion K3.

Incidentally, since the loop-shaped secondary travel path 6a are cleaned in the present embodiment, the cleaning carriage W is controlled to travel around the secondary travel path 6a once with one of the first cleaning portion K1, the second cleaning portion, and the third cleaning portions K3 in communication with the vacuum cleaner G.

Once the cleaning by one cleaning portion among the first cleaning portion K1 to the third cleaning portion K3 is completed, the interrupting means E is used to switched to a state in which another one of the first cleaning portion K1, second cleaning portion K2, and the third cleaning portion K3 is in communication with the vacuum cleaner G to perform cleaning by the cleaning portion that has not been used among the first cleaning portion K1 to the third cleaning portions K3. And the process of causing the cleaning carriage W travel with the vacuum cleaner G turned on is repeated until the cleaning by all of the first cleaning portion K1, the second cleaning portion K2, and the third cleaning portion K3 is completed.

[Alternative Embodiments]

Alternative embodiments are listed next.

(1) In the embodiment described above, an example is illustrated in which only the secondary travel paths are cleaned by the cleaning carriage in a facility where a plurality of secondary travel paths and a primary travel paths are provided. The cleaning carriage may be used to cleaning the primary travel path where it is possible to temporarily suspend the article transport by the transport carriages.

(2) In the embodiment described above, an example is illustrated in which the first cleaning portion to the third cleaning portion are provided as the plurality of cleaning suction portions and each is designated as a functioning unit. It is also possible to designate the first cleaning portion and the second cleaning portion as one functioning unit. And how a functioning unit is defined may be changed suitably.

(3) In the embodiment described above, an example is illustrated in which the back travel portion of the cleaning carriage has an identical structure as either of the pair of front and back travel portions of the transport carriage. However, the back travel portion of the cleaning carriage may have a structure different from that of the pair of front and back travel portions of the transport carriage.

(4) The plurality of locations to be cleaned in the travelling guide portion are not limited to those illustrated in the embodiment described above. And any of the various locations in the travelling guide that need to be cleaned may be designated as the location(s) to be cleaned.

(5) In the embodiment described above, an example is illustrated in which only one of the pair of front and back travel portions of the cleaning carriage is provided with travel wheels that are driven. However, each of the pair of travel portions may have driven or actuated travel wheels.

(6) In the embodiment described above, an example is illustrated in which a battery is mounted in the vacuum cleaner itself to power the vacuum cleaner by the battery. However, the battery to power the vacuum cleaner may be mounted to the cleaning carriage and separately from the suction vacuum cleaner.

(7) In the embodiment described above, arc-shaped path portions 5 are provided in the paths. However, these path portions 5 do not necessarily need to form an arc, and may be of any curve that can connect two straight path portions.

What is claimed is:

1. A cleaning device for a ceiling transport facility comprising:
   a travelling guide portion for a transport carriage, the travelling guide portion being provided on a ceiling side;
   a cleaning carriage that can travel along the travelling guide portion;
   a plurality of cleaning suction portions provided to the cleaning carriage for performing suctioning action on a plurality of locations to be cleaned in the travelling guide portion, the plurality of cleaning suction portions being divided into a plurality of functioning units;
   a vacuum cleaner provided to the cleaning carriage and connected to the plurality of cleaning suction portions for communication therewith; and
   interrupting mechanism configured to selectively permit and prevent the communication of each of the plurality of functioning units with the vacuum cleaner.

2. The cleaning device for a ceiling transport facility as defined in claim 1, wherein
   the cleaning carriage is provided with a fan filter unit which draws in air that is discharged from the vacuum cleaner and which discharges the air through a cleaning filter.

3. The cleaning device for a ceiling transport facility as defined in claim 2, wherein
   the vacuum cleaner is located inside a holding space U that is surrounded from above, below, right, left, front, and back such that the vacuum cleaner discharges air into the holding space, wherein
   the fan filter unit is provided such as to draw in air in the holding space.

4. The cleaning device for a ceiling transport facility as defined in claim 1, wherein
   the plurality of locations to be cleaned in the travelling guide portion include a traveling surface of a travel rail along which a travel wheel of the transport carriage travels.

5. The cleaning device for a ceiling transport facility as defined in claim 4, wherein
   the cleaning suction portion for the traveling surface is configured to be raised and lowered between a suction action position at which the cleaning suction portion for the traveling surface is in contact with the traveling surface and a retracted position at which the cleaning suction portion for the traveling surface is retracted upwardly from the traveling surface, wherein
   holding means is provided for holding the cleaning suction portion for the traveling surface at the retracted position.

6. The cleaning device for a ceiling transport facility as defined in claim 5, wherein
   the cleaning suction portion for the traveling surface includes a dust removing brush for sliding contact with the traveling surface, the dust removing brush being provided within a tubular member having a suction opening that faces the traveling surface.

7. The cleaning device for a ceiling transport facility as defined in claim 1, wherein
   the plurality of locations to be cleaned in the travelling guide portion include a top surface of a holding portion for holding an electricity supply line that contactlessly supplies electric power to the transport carriage.

8. The cleaning device for a ceiling transport facility as defined in claim 7, wherein
   the cleaning suction portion for the top surface of the holding portion is configured to be raised and lowered between a suction action position at which the cleaning suction portion for the top surface is in contact with the top surface of the said holding portion and a retracted position at which the cleaning suction portion for the top surface is retracted upwardly from the top surface of the holding portion, wherein
   holding means is provided for holding the cleaning suction portion for the top surface of the holding portion at the retracted position.

9. The cleaning device for a ceiling transport facility as defined in claim 1, wherein
   the plurality of locations to be cleaned in the travelling guide portion include a guide surface of a guide rail for guiding a guide wheel that can be rotated about a vertically extending axis and that is provided in an upper portion of the transport carriage.

10. The cleaning device for a ceiling transport facility as defined in claim 9, wherein
    the cleaning suction portion for the guide surface includes a dust removing brush for sliding contact with the guide surface, and a suctioning dish-shaped member that is located rearwardly of the dust removing brush and that opens upwardly.

11. The cleaning device for a ceiling transport facility as defined in claim 1, wherein
    the transport carriage and the cleaning carriage include
    a pair of front and back travel portions that travel along the travelling guide portion and
    a suspended portion that is suspended and supported through connecting shafts such that the suspended portion can be rotated with respect to each of the pair of the front and back travel portions about axes of the connecting shafts that extend downwardly from respective travel portions and that extend along a vertical direction wherein
    the suspended portion of the transport carriage is configured as an article support for supporting an article to be transported, wherein
    the suspended portion of the cleaning carriage is configured as a vacuum cleaner support for supporting the vacuum cleaner, and wherein
    one of the pair of front and back travel portions of the cleaning carriage is provided with the plurality of cleaning suction portions and the interrupting mechanism.

12. The cleaning device for a ceiling transport facility as defined in claim 11, wherein
    one of the front and back connecting shafts of the cleaning carriage, that suspends and supports the suspended portion to the travel portion to which the plurality of cleaning suction portions and the interrupting mechanism are provided, is formed to be tubular such that the connecting shaft forms a part of a channel that connects the vacuum cleaner and the plurality of cleaning suction portions for communication, wherein
    a flexible suction hose that extends from the vacuum cleaner is connected to a lower end portion of the connecting shaft that forms the channel.

13. The cleaning device for a ceiling transport facility as defined in claim 11, wherein
    one of the pair of travel portions, of the cleaning carriage, to which the plurality of cleaning suction portions and the interrupting mechanism are provided, includes a pair of right and left first travel wheels located at a position forward of the connecting shaft in a side view, and another pair of right and left second travel wheels located at a position rearward of the connecting shaft, wherein the cleaning suction portion, of the plurality of cleaning suction portions, that performs suctioning action on the traveling surface of the travel rail along which the travel wheel of the transport carriage travels is located between the first travel wheels and the second travel wheels in a side view.

* * * * *